US012041242B2

(12) United States Patent
Lee et al.

(10) Patent No.: US 12,041,242 B2
(45) Date of Patent: *Jul. 16, 2024

(54) IMAGE ENCODING/DECODING METHOD AND APPARATUS, AND RECORDING MEDIUM FOR STORING BITSTREAM

(71) Applicants: Electronics and Telecommunications Research Institute, Daejeon (KR); HANBAT NATIONAL UNIVERSITY INDUSTRY-ACADEMIC COOPERATION FOUNDATION, Daejeon (KR)

(72) Inventors: Ha Hyun Lee, Daejeon (KR); Jung Won Kang, Daejeon (KR); Sung Chang Lim, Daejeon (KR); Jin Ho Lee, Daejeon (KR); Hui Yong Kim, Daejeon (KR); Hae Chul Choi, Daejeon (KR); Dae Hyeok Gwon, Daejeon (KR); Jae Ryun Choi, Daejeon (KR)

(73) Assignees: ELECTRONICS AND TELECOMMUNICATIONS RESEARCH INSTITUTE, Daejeon (KR); HANBAT NATIONAL UNIVERSITY INDUSTRY-ACADEMIC COOPERATION FOUNDATION, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,458

(22) Filed: Apr. 19, 2023

(65) Prior Publication Data
US 2023/0300340 A1    Sep. 21, 2023

Related U.S. Application Data

(63) Continuation of application No. 17/419,220, filed as application No. PCT/KR2019/018629 on Dec. 27, 2019, now Pat. No. 11,671,603.

(30) Foreign Application Priority Data

Dec. 28, 2018   (KR) .................. 10-2018-0172114
Jan. 9, 2019    (KR) .................. 10-2019-0002675
Mar. 15, 2019   (KR) .................. 10-2019-0029926

(51) Int. Cl.
*H04N 19/00*   (2014.01)
*H04N 19/105*  (2014.01)
(Continued)

(52) U.S. Cl.
CPC ......... *H04N 19/137* (2014.11); *H04N 19/105* (2014.11); *H04N 19/159* (2014.11); *H04N 19/176* (2014.11)

(58) Field of Classification Search
CPC ..................................................... H04N 19/00
See application file for complete search history.

(56) References Cited

U.S. PATENT DOCUMENTS

2006/0013317 A1   1/2006   Lainema
2013/0243093 A1   9/2013   Chen et al.
(Continued)

FOREIGN PATENT DOCUMENTS

JP   2017533669 A   11/2017
KR   100772576 B1   11/2007
(Continued)

OTHER PUBLICATIONS

Seungsoo Jeong et al., "CE4 Ultimate motion vector expression in J0024 (Test 4.2.9)," JVET-K0115-v4, Joint Video Experts Team (JVET) of ITU-T SG 16 WP 3 and ISO/IEC JTC 1/SC29/WG 11, Document: JVET-K0115-v4, 11th Meeting: Ljubljana, SI, Jul. 10-18, 2018, Samsung Electronics Co., Ltd., pp. 1-7.
(Continued)

Primary Examiner — Maryam A Nasri
(74) Attorney, Agent, or Firm — Sughrue Mion, PLLC

(57) ABSTRACT

Disclosed herein is a method of decoding an image. The method includes determining a prediction mode of a current (Continued)

block as a merge mode with motion vector difference (MMVD), deriving a merge candidate list of the current block, deriving a motion vector predictor of the current block using the merge candidate list, deriving a motion vector difference of the current block, and deriving a motion vector of the current block using the motion vector predictor and the motion vector difference. Only some of candidates in the merge candidate list are used to derive the motion vector predictor.

12 Claims, 12 Drawing Sheets

(51) Int. Cl.
*H04N 19/137* (2014.01)
*H04N 19/159* (2014.01)
*H04N 19/176* (2014.01)

(56) References Cited

U.S. PATENT DOCUMENTS

2021/0044825 A1  2/2021  Lee et al.
2021/0337196 A1* 10/2021  Lee ........................ H04N 19/54

FOREIGN PATENT DOCUMENTS

KR  1020110135763 A  12/2011
KR  1020120010738 A  2/2012

OTHER PUBLICATIONS

Benjamin Bross, et al., "Versatile Video Coding (Draft 3)", Joint Video Experts Team (JVET) of ITU-T SG 16 WP 3 and ISO/IEC JTC 1/SC 29/WG 11, JVET-L1001-v7, 12th Meeting: Macao, CN, Oct. 3-12, 2018 (223 pages total).

* cited by examiner (a)  (b)

(a)

(b)

IMAGE ENCODING/DECODING METHOD AND APPARATUS, AND RECORDING MEDIUM FOR STORING BITSTREAM

CROSS-REFERENCE TO RELATED APPLICATIONS

The present application is a continuation application of U.S. application Ser. No. 17/419,220, filed on Jun. 28, 2021, which was the National Stage of International Application No. PCT/KR2019/018629 filed on Dec. 27, 2019, which claims priority to Korean Patent Applications: KR10-2018-0172114, filed on Dec. 28, 2018, KR10-2019-0002675, filed on Jan. 9, 2019, and KR10-2019-0029926, filed on Mar. 15, 2019, with the Korean Intellectual Property Office, which are incorporated herein by reference in their entirety.

TECHNICAL FIELD

The present invention relates to an image encoding/decoding method and apparatus, and a recording medium for storing a bitstream. More particularly, the present invention relates to a method and apparatus for encoding/decoding an image using a merge mode with motion vector difference (MMVD) and a detailed merge mode, and a recording medium for storing a bitstream.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

DISCLOSURE

Technical Problem

An object of the present invention is to provide an image encoding/decoding method and apparatus with improved compression efficiency, and a recording medium for storing a bitstream generated by the image encoding/decoding method/apparatus of the present invention.

Another object of the present invention is to provide a method and apparatus for using a merge mode with motion vector difference (MMVD) in order to improve image encoding/decoding efficiency, and a recording medium for storing a bitstream.

Another object of the present invention is to provide a method and apparatus for using a detailed merge mode in order to improve image encoding/decoding efficiency, and a recording medium for storing a bitstream.

Technical Solution

A method of decoding an image according to the present invention includes determining a prediction mode of a current block as a merge mode with motion vector difference (MMVD), deriving a merge candidate list of the current block, deriving a motion vector predictor of the current block using the merge candidate list, deriving a motion vector difference of the current block, and deriving a motion vector of the current block using the motion vector predictor and the motion vector difference. Only some of candidates in the merge candidate list are used to derive the motion vector predictor.

Only a predefined number of candidates among the candidates in the merge candidate list may be used to derive the motion vector predictor.

Only a first candidate and a second candidate among the candidates in the merge candidate list may be used to derive the motion vector predictor.

The motion vector of the current block may be derived through a sum of the motion vector predictor and the motion vector difference.

The method may further include decoding information on the motion vector difference of the current block, and the information on the motion vector difference may include at least one of distance information of the motion vector difference, direction information of the motion vector difference or precision information of the motion vector difference.

The direction information of the motion vector difference indicates that the motion vector difference of the current block may be represented by one of direction component sets (+,0), (−,0), (0,+) and (0,−).

The precision information of the motion vector difference may indicate whether the motion vector difference of the current block uses integer sample precision. The distance information of the motion vector difference may indicate one of values of a distance value set used to derive the distance of the motion vector difference. When the motion vector difference of the current block uses integer sample precision, the distance of the motion vector difference is derived using a first distance value set. When the motion vector difference of the current block uses fractional sample precision, the distance of the motion vector difference may be derived using a second distance value set.

The first distance value set may be (4, 8, 16, 32, 64, 122, 256, 512), and the second distance value set may be (1, 2, 4, 8, 16, 32, 64, 128).

A method of encoding an image according to the present invention includes determining a prediction mode of a current block as a merge mode with motion vector difference (MMVD), deriving a merge candidate list of the current block, deriving information on a merge index and a motion vector difference of the current block using the merge candidate list, and encoding the information on the merge index and the motion vector difference. The merge index indicates only some of candidates in the merge candidate list.

Only a predefined number of candidates among the candidates in the merge candidate list may be indicated by the merge index.

Only a first candidate and a second candidate among the candidates in the merge candidate list may be indicated by the merge index.

The information on the motion vector difference may include at least one of distance information of the motion vector difference, direction information of the motion vector difference or precision information of the motion vector difference.

The direction information of the motion vector difference may indicate that the motion vector difference of the current block is represented by one of direction component sets (+,0), (−,0), (0,+) and (0,−).

The precision information of the motion vector difference may indicate whether the motion vector difference of the current block uses integer sample precision.

The distance information of the motion vector difference may indicate one of values of a distance value set used to derive the distance of the motion vector difference. When the motion vector difference of the current block uses integer sample precision, the distance of the motion vector difference may be derived using a first distance value set. When the motion vector difference of the current block uses fractional sample precision, the distance of the motion vector difference may be derived using a second distance value set.

The first distance value set may be (4, 8, 16, 32, 64, 122, 256, 512), and the second distance value set may be (1, 2, 4, 8, 16, 32, 64, 128).

According to the present invention, there is provided a non-transitory computer-readable recording medium for storing a bitstream used to reconstruct a current block received by an image encoder/decoder and included in a current picture, wherein the bitstream comprises information on a prediction mode of the current block, information on prediction of the current block and information on a motion vector difference of the current block, wherein the information on the prediction mode of the current block is used to determine the prediction mode of the current block as a merge mode with motion vector difference (MMVD), wherein the information on prediction of the current block is used to derive a merge candidate list of the current block, wherein the merge candidate list is used to derive a motion vector predictor of the current block, wherein information on the motion vector difference of the current block is used to derive the motion vector difference of the current block, wherein the motion vector predictor and the motion vector difference are used to derive a motion vector of the current block, and wherein only some of candidates in the merge candidate list are used to derive the motion vector predictor.

Advantageous Effects

According to the present invention, it is possible to provide an image encoding/decoding method and apparatus with improved compression efficiency, and a recording medium for storing a bitstream generated by the image encoding/decoding method/apparatus of the present invention.

According to the present invention, it is possible to provide a method and apparatus capable of improving compression efficiency using a merge mode with motion vector difference (MMVD), and a recording medium for storing a bitstream.

According to the present invention, it is possible to provide a method and apparatus capable of improving compression efficiency using a detailed merge mode, and a recording medium for storing a bitstream.

MODE FOR INVENTION

Figure 1:
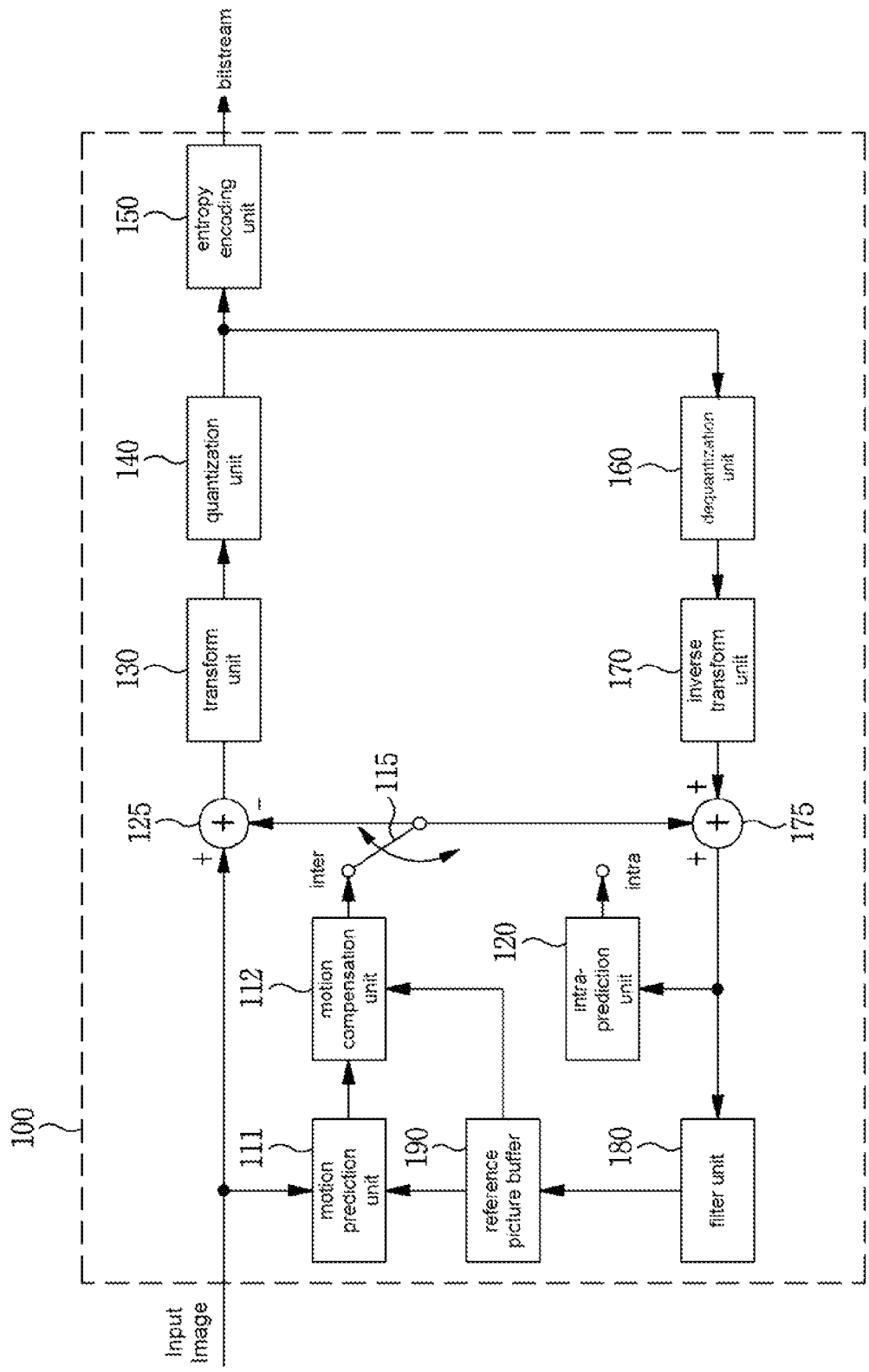
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad tree form, whether to partition of a binary tree form, a partition direction of a binary tree form (horizontal direction or vertical direction), a partition form of a binary tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
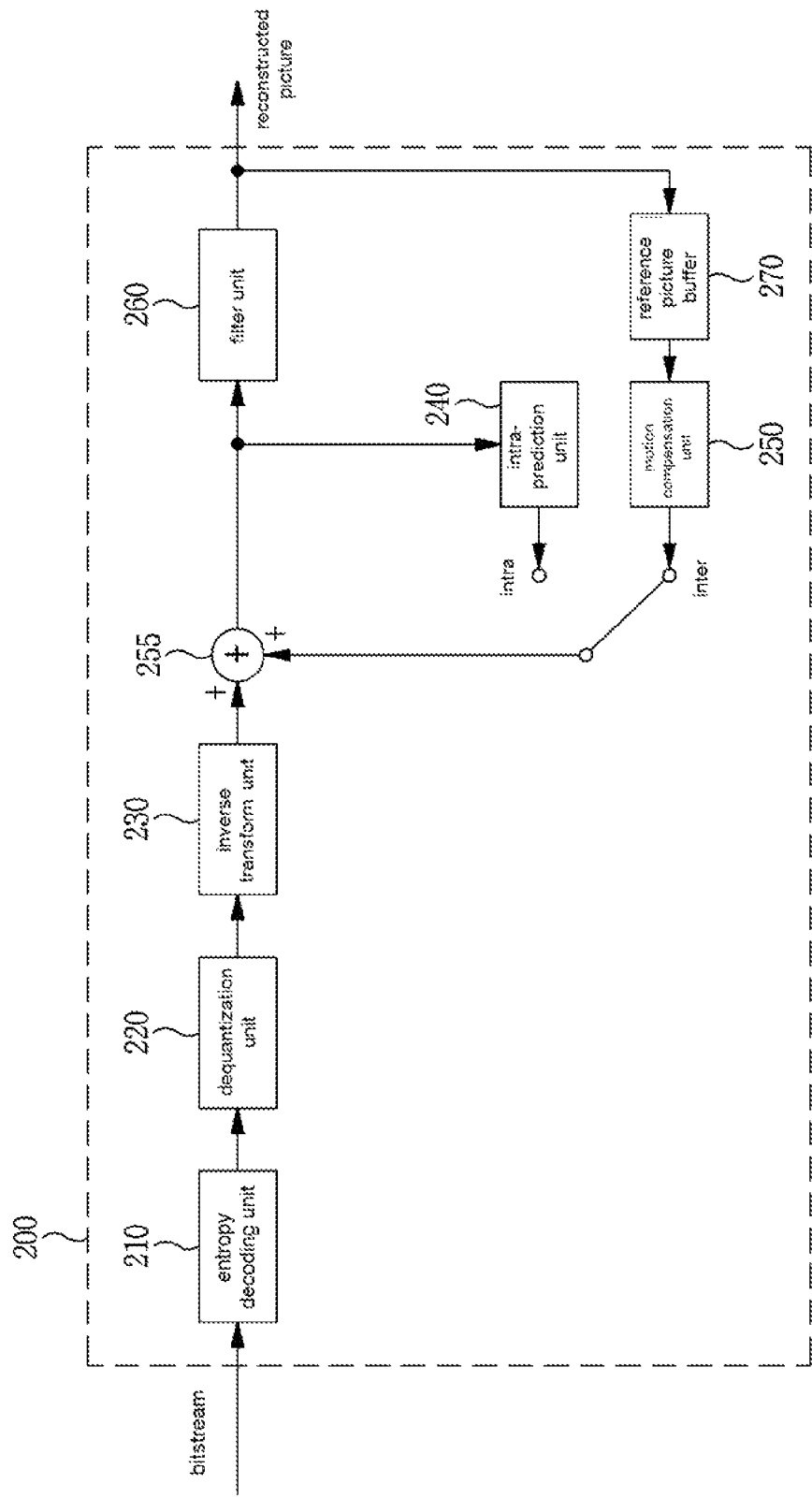
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
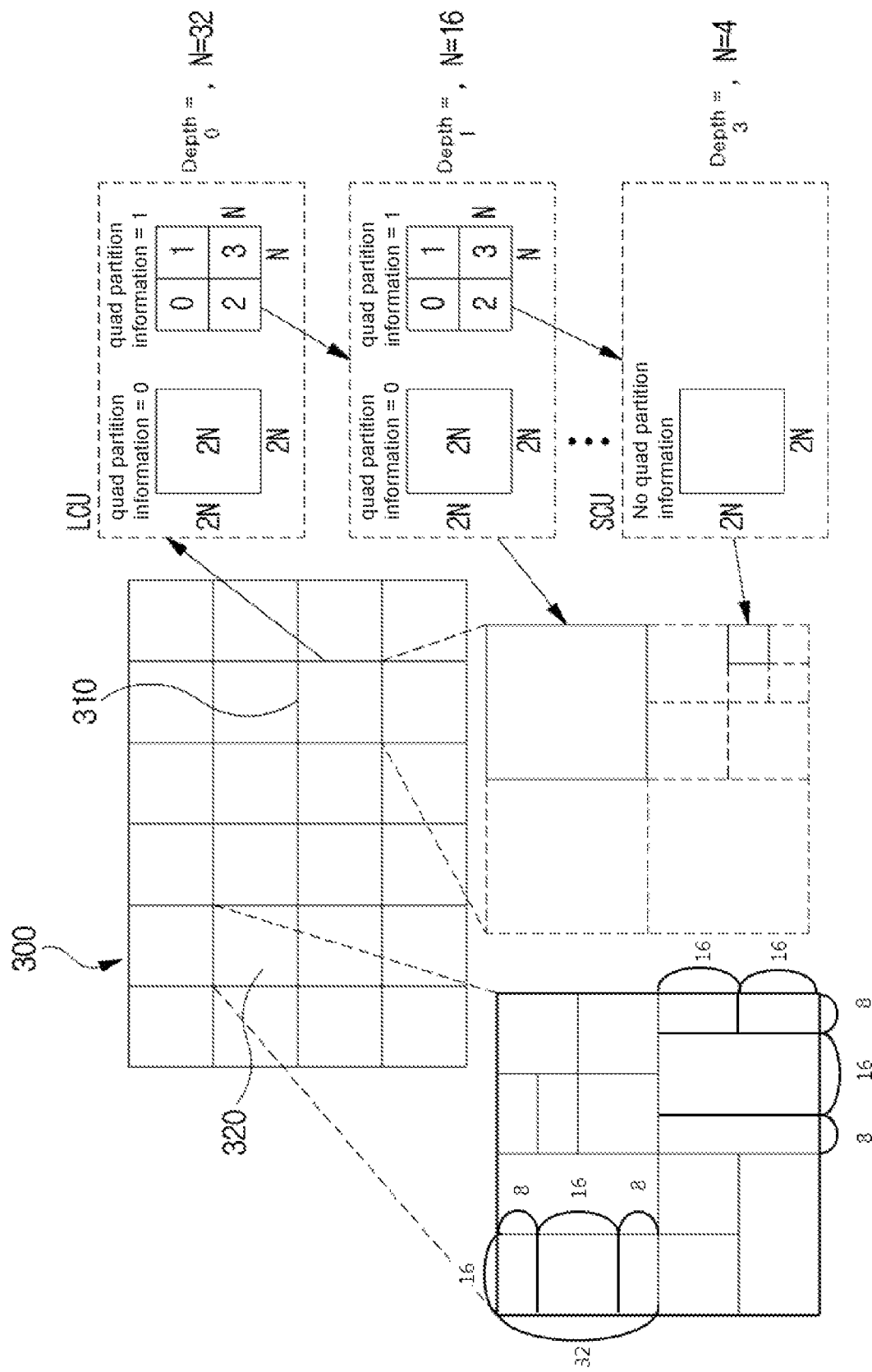
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and an LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
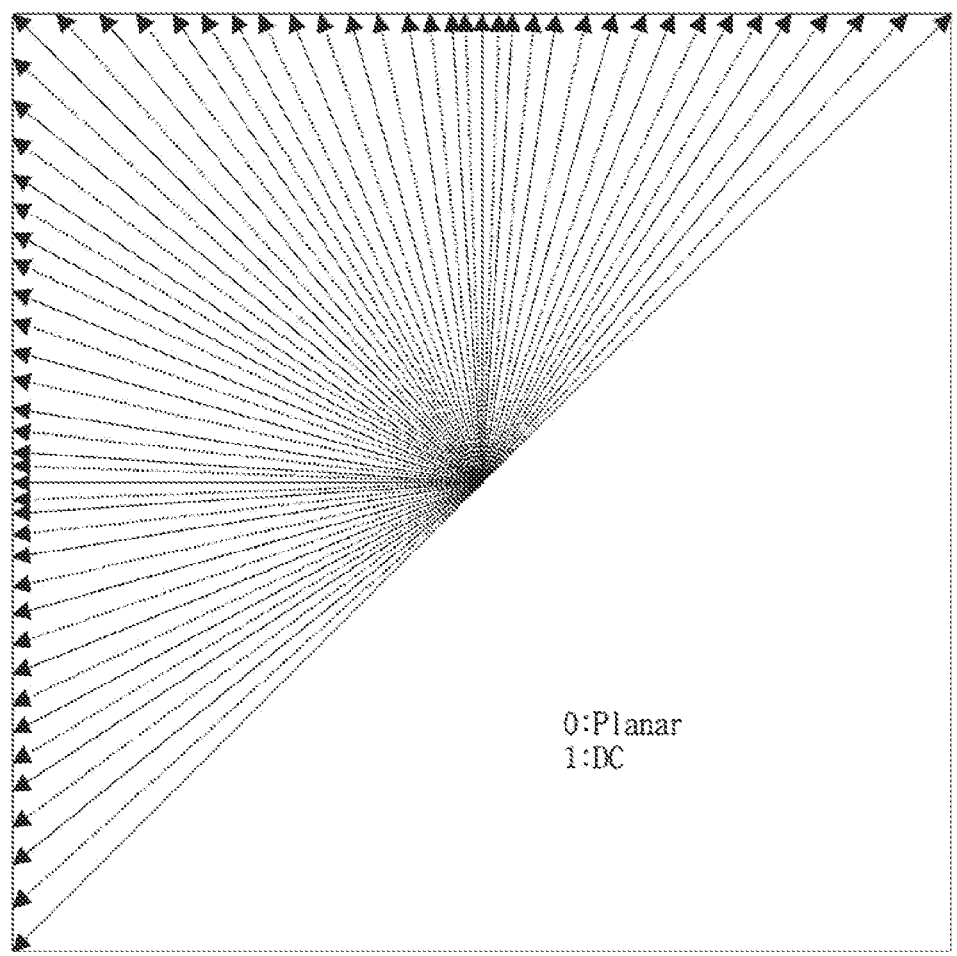
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
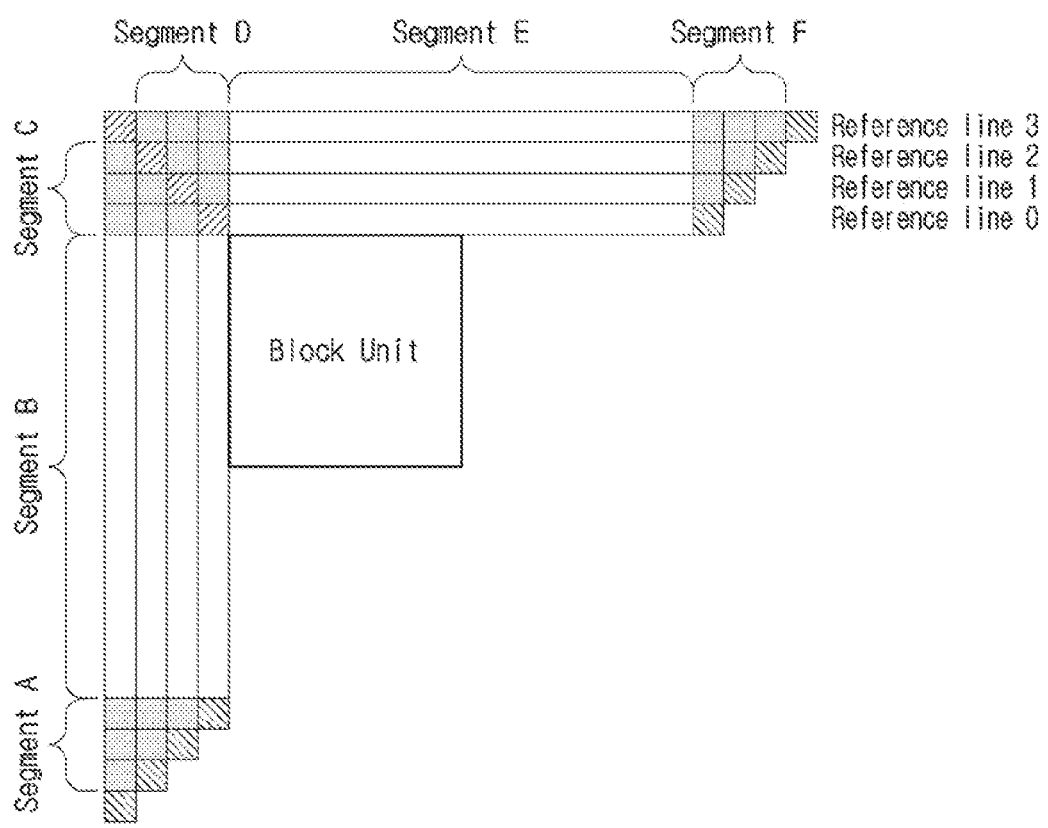
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
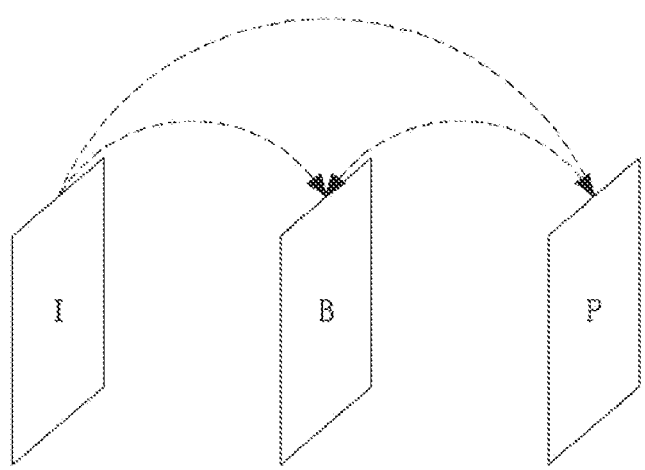
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighing a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
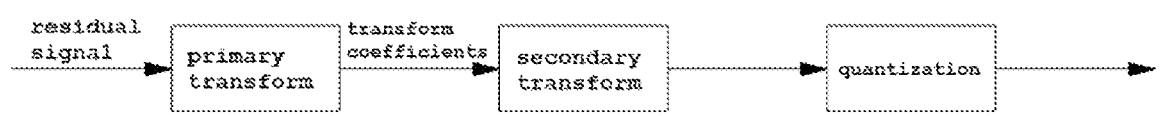
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block) The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loéve transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

In the following specification, the following terms may be used.

A skip mode may mean a mode in which a motion vector of a neighbor block is used but a residual image signal is not transmitted.

A merge mode may mean a mode in which a motion vector of a neighbor block is used and a residual image signal is transmitted. In another example, the merge mode may mean a mode in which a motion vector of a neighbor block is used regardless of whether a residual image signal is transmitted. In this case, the merge mode may include all a skip mode, a regular merge mode, a subblock based merge mode, a triangular partition merge mode, and an inter-intra combination prediction mode.

A motion vector predictor (MVP) may mean a motion vector of a temporal or spatial neighbor block of a current block.

A motion vector difference (MVD) may mean a vector difference between a motion vector predictor and an actual motion vector of a current block.

A merge mode with motion vector difference (MMVD) may mean a merge mode in which a motion vector of a current block is derived using a motion vector difference.

A multi-hypothesis mode may mean a combined inter-picture merge and intra-picture prediction mode.

Specifically, the multi-hypothesis mode may mean a prediction mode performed by merging prediction using an inter-picture merge mode and prediction using an intra-picture prediction mode. The multi-hypothesis mode may mean an inter-intra combination prediction mode.

A triangular merge mode may mean a triangular inter-picture prediction mode. Specifically, the triangular merge mode may mean a prediction mode in which inter-picture prediction is performed with respect to each subblock by sub-partitioning a current CU in a diagonal direction.

In addition, in the following specification, the following syntax elements may be defined.

A syntax element merge_idx may mean a merge index indicating one candidate of a merge candidate list.

A syntax element mmmvd_flag or mmmvd_merge_flag may be an indicator indicating whether to use an MMVD. For example, when mmvd_flag or mmvd_merge_flag indicates a first value, a current block may be encoded or decoded using the MMVD. In contrast, when mmvd_flag or mmvd_merge_flag indicates a second value, a current block may not be encoded using the MMVD.

A syntax element mmmvd_direction_idx may be an indicator indicating the sign information of a motion vector difference used in the MMVD.

A syntax element mmmvd_distance or mmvd_distance_idx may be an indicator indicating distance information of a motion vector difference used in the MMVD.

A syntax element MaxNumMergeCand may indicate a maximum number of candidates included in the merge candidate list.

A syntax element MaxNumMMVDCand may indicate a maximum number of candidates included in an MMVD MVP (motion vector prediction) candidate list.

A syntax element nmvd_cand_flag may be an indicator indicating one of candidates of an MMVD MVP candidate list. Meanwhile, for example, mmvd_cand_flag may be signaled using a truncated unary coding method according to the maximum number of candidates included in the merge candidate list. In addition, for example, mmvd_cand_flag may be signaled using a fixed length method, when the maximum number of candidates included in the merge candidate list is 2.

Hereinafter, a method of encoding/decoding an image using a merge mode with motion vector difference (MMVD) according to an embodiment of the present invention will be described in detail.

The image may be encoded/decoded according to at least one of the following embodiments or a combination thereof. Using the following embodiments, a reference block of a current block may be efficiently determined in an image encoding/decoding process, thereby improving encoding efficiency of an image encoder and decoding efficiency of an image decoder.

Figure 8:
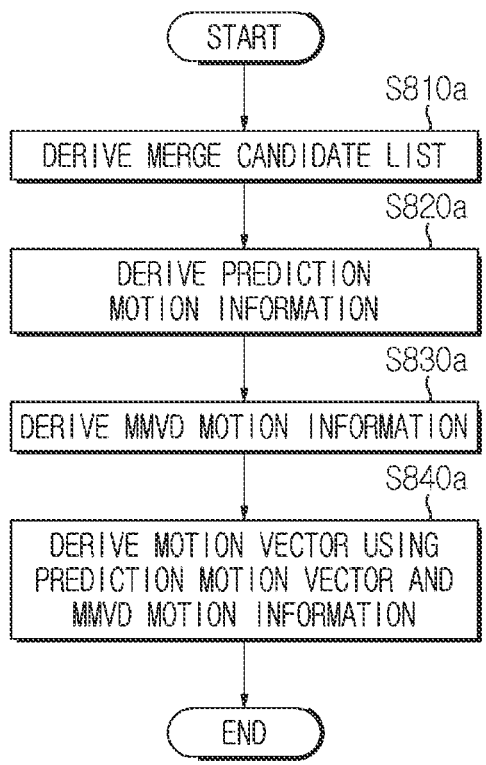
FIG. 8 is a flowchart illustrating an image encoding/decoding method according to an embodiment of the present invention.
Figure 8:
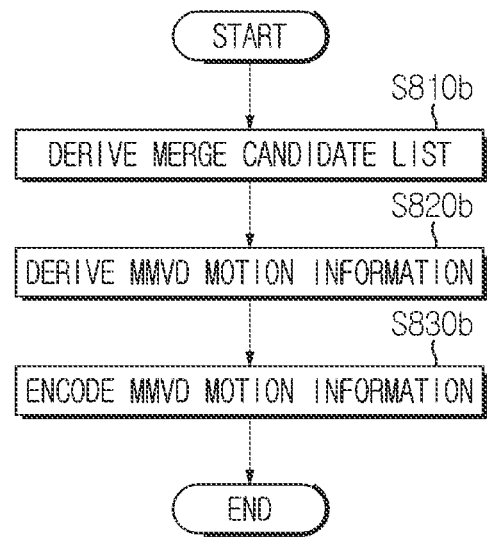

FIG. 8 is a flowchart illustrating an image encoding/decoding method according to an embodiment of the present invention.

Referring to FIG. 8(*a*), the image decoding method according to one embodiment of the present invention may include step S810*a* of deriving a merge candidate list of a current block, step S820*a* of deriving predictive motion information of the current block using a merge index of the current block, step S830*a* of deriving MMVD motion information of the current block, and step S840*a* of deriving a motion vector of the current block using the predictive motion information and the MMVD motion information.

Referring to FIG. 8(*b*), the image encoding method according to one embodiment of the present invention may include step S810*b* of deriving a merge candidate list of a current block, step S820*b* of deriving MMVD motion information of the current block using the merge candidate list, and step S830*b* of encoding the MMVD motion information.

In this case, the MMVD motion information may be derived based on at least one of syntax elements mmvd_flag, mmvd_merge_flag, mmvd_cand_flag, merge_idx, mmvd_distance_idx, mmvd_direction_idx and six_minus_max_mmvd_cand.

In addition, whether to perform the step of deriving the MMVD motion information may be determined based on at least one of an encoding parameter, picture information, slice information, a quantization parameter (QP), a coding block flag (CBF), a block size, a block depth, a block form, an entropy encoding method, an intra prediction mode of a neighbor block or a temporal layer level.

Figure 9:
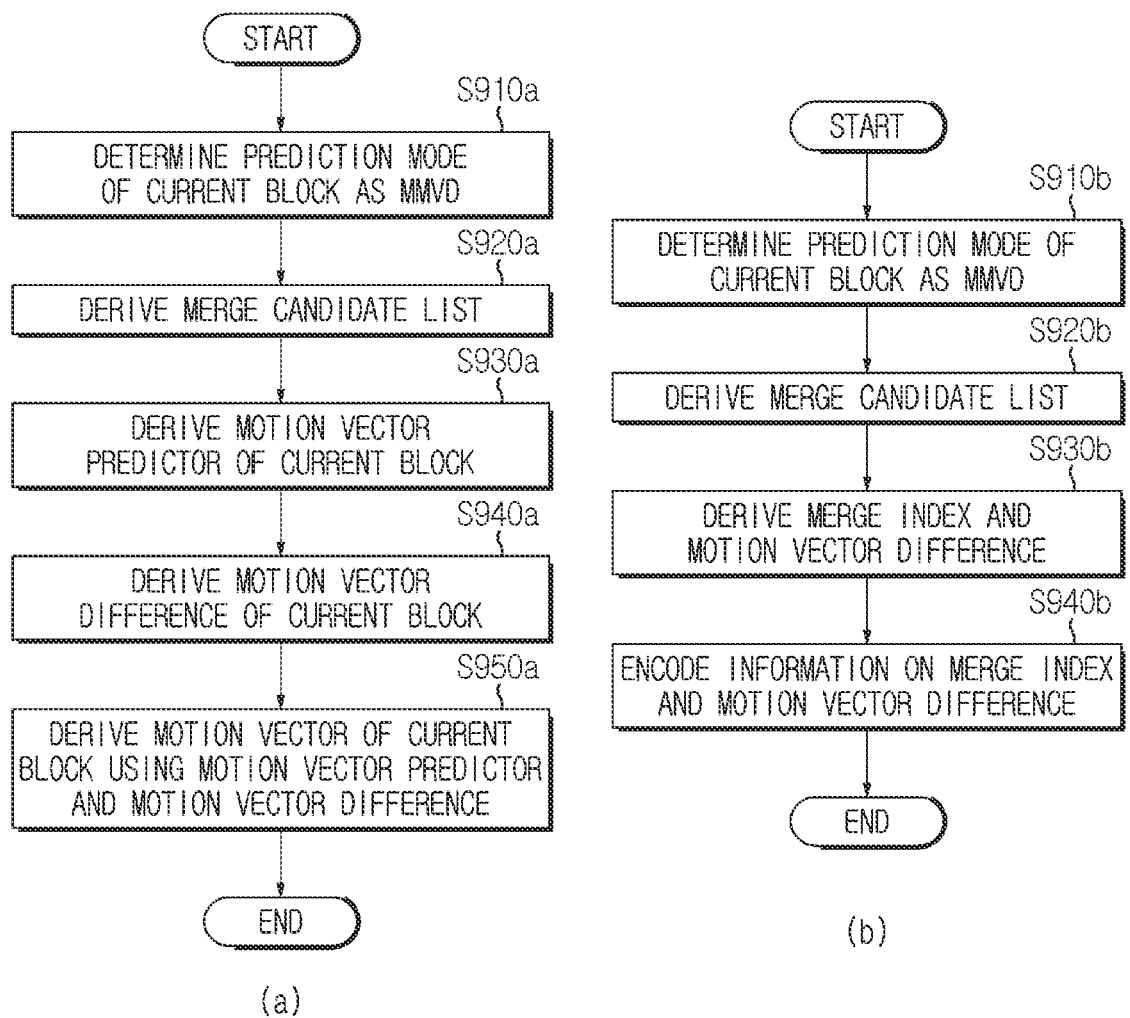
FIG. 9 is a flowchart illustrating an image encoding/decoding method according to another embodiment of the present invention.

FIG. 9 is a flowchart illustrating an image encoding/decoding method according to another embodiment of the present invention.

Referring to FIG. 9*a*, the decoding method according to another embodiment of the present invention may include step S910*a* of determining the prediction mode of a current block as an MMVD, step S920*a* of deriving a merge candidate list of the current block, step S930*a* of deriving a motion vector predictor of the current block using the merge candidate list, step S940*a* of deriving a motion vector difference of the current block, and step S950*a* of deriving a motion vector of the current block using the motion vector predictor and a motion vector difference.

In this case, when the prediction mode of the current block is determined as the MMVD, only some of the candidates in the merge candidate list may be used to derive the motion vector predictor.

For example, when the prediction mode of the current block is determined as the MMVD, only a predefined number of candidates among the candidates in the merge candidate list may be used to derive the motion vector predictor. In this case, the predefined number may be 2. That is, the maximum number of available candidates of the current block may be determined depending on whether the prediction mode is the MMVD.

In another example, when the prediction mode of the current block is determined as the MMVD, only first and second candidates among the candidates in the merge candidate list may be used to derive the motion vector predictor. That is, the merge index of the current block may indicate one of the first candidate and the second candidate in the merge candidate list.

In another example, when the prediction mode of the current block is determined as the MMVD, merge_idx may not be signaled but mmvd_cand_flag may be signaled. The mmvd_cand_flag may indicate one of the first candidate and the second candidate in the merge candidate list. That is, the maximum number of available candidates of the current block may be determined according to mmvd_merge_flag.

In this case, when the prediction mode of the current block is not determined as the MMVD, a candidate indicated by merge_idx among the candidates in the merge candidate list may be used to derive the motion vector predictor.

In another example, when the prediction mode of the current block is not determined as the MMVD, only the first candidate of the candidates in the merge candidate list may be used to derive the motion vector predictor.

Referring to FIG. 9b, the encoding method according to another embodiment of the present invention may include step S910b of determining the prediction mode of a current block as an MMVD, step S920b of deriving a merge candidate list of the current block, step S930b of deriving a merge index and a motion vector difference of the current block using the merge candidate list, and step S940b of encoding information on the merge index and a motion vector difference.

In this case, when the prediction mode of the current block is determined as the MMVD, the merge index of the current block may be signaled using mmvd_cand_flag. That is, when the prediction mode of the current block is determined as the MMVD, merge_idx may not be encoded but mmvd_cand_flag may be encoded.

For example, the merge index of the current block may indicate only some of the candidates in the merge candidate list.

In another example, only a predefined number of candidates among the candidates in the merge candidate list may be indicated by the merge index. In this case, the predefined number may be 2.

In another example, only the first and second candidates of the candidates in the merge candidate list may be indicated by the merge index. That is, the merge index of the current block may indicate one of the first candidate and the second candidate in the merge candidate list.

Hereinafter, the steps shown in FIG. 8 or 9 will be described in detail.

First, the step of determining the prediction mode of the current block as the MMVD and the step of deriving/determining the MMVD motion information or the motion vector difference of the current block will be described.

According to one embodiment of the present invention, when the current block is not encoded or decoded in the MMVD or mmvd_merge_flag has a second value, the motion vector of the current block may be derived using only a motion vector predictor (MVP). That is, the motion vector predictor may be used as the motion vector of the current block.

For example, the motion vector predictor may be derived using a merge candidate indicated by merge_idx among the merge candidates included in the merge candidate list of the current block. In this case, the maximum number of candidates included in the merge candidate list may be predefined or may be determined by a value signaled from the encoder to the decoder. For example, the maximum number MaxNumMergeCand of candidates included in the merge candidate list may be 1 or more and 6 or less. For example, the maximum number MaxNumMergeCand of candidates included in the merge candidate list may be 6.

According to one embodiment of the present invention, when mmvd_merge_flag has a second value (that is, the prediction mode of the current block is not the MMVD), the prediction mode of the current block may be determined as a regular merge mode and thus merge_idx may be encoded/decoded. That is, when mmvd_merge_flag has a second value, the prediction mode information other than the regular merge mode may not be encoded/decoded but only merge_idx may be encoded/decoded.

Meanwhile, merge_idx may be represented using a truncated unary coding method according to the value of the maximum number MaxNumMergeCand of candidates included in the merge candidate list. For example, merge_idx may be represented using a binary table of Table 1 below.

TABLE 1

| Index | N = 6 |
|---|---|
| 0 | 0 |
| 1 | 10 |
| 2 | 110 |
| 3 | 1110 |
| 4 | 11110 |
| 5 | 11111 |

In another example, the motion vector predictor may be derived using one of the affine merge candidates included in the affine merge candidate list of the current block. For example, the motion vector predictor may be derived using the motion vector of the affine merge candidate indicated by merge_subblock_idx. The affine merge candidate list may mean a subblock merge candidate list.

In another example, the motion vector predictor may be derived using one of multi-hypothesis merge candidates included in a multi-hypothesis merge candidate list of the current block. For example, the motion vector predictor may be derived using the motion vector of the multi-hypothesis merge candidate indicated by mh_intra_idx. The multi-hypothesis merge candidate may mean an inter-intra combination prediction mode.

In another example, the motion vector predictor may be derived using one of triangular merge candidates included in a triangular merge candidate list of the current block. For example, the motion vector predictor may be derived using the motion vectors of the triangular merge candidates indicated by merge_triangle_idx0 and merge_triangle_idx1.

When the current block is encoded in the MMVD or mmvd_merge_flag has a first value, the motion vector of the current block may be derived using a motion vector predictor (MVP) and a motion vector difference (MVD). For example, the motion vector of the current block may be determined by a sum of the motion vector predictor and the motion vector difference.

For example, the motion vector predictor may be derived using one of the MMVD MVP candidates included in an MMVD MVP candidate list. For example, the motion vector predictor may be derived using the motion vector of the MMVD MVP candidate indicated by mmvd_cand_flag.

When the current block is encoded in the MMVD, merge_idx may be set to mmvd_cand_flag. For example, when the current block is encoded in the MMVD, the merge candidate list may be used as or replaced with the MMVD MVP candidate list. In the following embodiments, the MMVD MVP candidate list and the merge candidate list may have the same configuration.

When the current block is encoded in the MMVD, the motion vector predictor of the current block may be derived using the merge candidate of the merge candidate list indicated by mmvd_cand_flag. In another example, when the current block is encoded in the MMVD, merge_idx may not be encoded, but mmvd_cand_flag may be encoded. The decoder may set the value of mmvd_cand_flag as the value of merge_idx and use the value of mmvd_cand_flag to derive the motion vector predictor of the current block.

The maximum number MaxNumMMVDCand of candidates included in the MMVD MVP candidate list may be predefined or determined by a value signaled from the encoder to the decoder. For example, the maximum number MaxNumMMVDCand of candidates included in the MMVD MVP candidate list may be 2.

Meanwhile, mmvd_cand_flag may be represented using a fixed length method according to the value of the maximum number MaxNumMergeCand of candidates included in the merge candidate list or the maximum number MaxNumMMVDCand of candidates included in the MMVD MVP candidate list. For example, mmvd_cand_flag may be represented using a binary table of Table 2 below.

TABLE 2

| mmvd_merge_flag | N = 2 |
|---|---|
| 0 | 0 |
| 1 | 1 |

For example, the motion vector difference may be signaled using a direction component and a distance component as follows. In the following embodiments, MmvdSign may mean the direction component of the motion vector difference, and an MmvdDistance may mean the distance information of the motion vector difference. The direction component and the distance component of the motion vector difference may mean not only the actual direction and distance values of the motion vector difference but also information used to derive the actual sign and distance value information of the motion vector difference.

The direction component MmvdSign of the motion vector difference may be derived using mmvd_direction_idx. In this case, mmvd_direction_idx may indicate that the motion vector difference has one of direction component sets (+,0), (−,0), (0,+) and (0,−).

In addition, the distance component MmvdDistance of the motion vector difference may be derived using mmvd_distance_idx. In this case, mmvd_distance_idx may indicate that the distance component of the motion vector difference has one of 1, 2, 4, 8, 16, 32, 64, 128, 256 and 512.

The distance component MmvdDistance of the motion vector difference may be derived using mmvd_distance_idx and mmvd correction information. Here, the mmvd correction information is information for selectively using the range of mmvd_distance_idx value and may be a syntax element mmvd_refine_step or pic_fpel_mmvd_enabled_flag. For example, MmvdDistance according to mmvd_distance_idx may be derived using the mmvd correction information.

In addition, for example, mmvd_distance_idx may have a value from 0 to 7. That is, there are eight types of values of mmvd_distance_idx. For example, MmvdDistance may have a value one of 1, 2, 4, 8, 16, 32, 64 and 128 or 4, 8, 16, 32, 64, 128, 256 and 512 according to a value indicated by mmvd_distance_idx and the mmvd correction information. For example, when the mmvd correction information value has a first value, MmvdDistanace may be one of 1, 2, 4, 8, 16, 32, 64 and 128. In another example, when the mmvd correction information value has a second value, MmvdDistance may have a value of one of 4, 8, 16, 32, 64, 128, 256 and 512. The first value and the second value may respectively mean "0" and "1" or "1" and "0".

In this case, mmvd_distance_idx may be binarized using a truncated unary coding method as shown in Table 3 below.

TABLE 3

| Index | 0 | 1 | 2 | 3 | 4 | 5 | 6 | 7 |
|---|---|---|---|---|---|---|---|---|
| mmvd_distance_idx | 0 | 10 | 110 | 1110 | 11110 | 111110 | 1111110 | 11111111 |

Meanwhile, mmvd_direction_idx may be binarized using a fixed length coding method as shown in Table 4 below.

TABLE 4

| | Index | | | |
|---|---|---|---|---|
| | 0 | 1 | 2 | 3 |
| mmvd_direction_idx | 00 | 01 | 10 | 11 |

According to another embodiment of the present invention, MMVD motion information may be derived using at least one of mmvd_merge_flag, mmvd_cand_flag, merge_idx, mmvd_direction_idx or mmvd_distance_idx.

For example, when the current block is encoded in the MMVD, the motion vector difference may be derived using mmvd_direction_idx and mmvd_distance_idx. For example, MmvdDistance indicated by mmvd_distance_idx may be used as the distance component of one axis of the motion vector difference. Mmvd_direction_idx may indicate that the sign of the component of one axis of the motion vector difference is positive or negative.

For example, when the current block is encoded in the MMVD or mmvd_merge_flag has a first value, at least one of merge_idx or mmvd_cand_flag may be signaled. In addition, when the current block is encoded in the MMVD or mmvd_merge_flag has a first value, at least one of mmvd_distance_idx or mmvd_direction_idx may be signaled.

In contrast, when the current block is not encoded in the MMVD or mmvd_merge_flag has a second value, merge_idx may be signaled, but at least one of mmvd_distance_idx or mmvd_direction_idx may not be signaled. In addition, when the current block is not encoded in the MMVD or mmvd_merge_flag has a second value, the current block may be encoded using at least one of a merge mode, an affine merge mode, a multi-hypothesis merge mode or a triangular merge mode.

For example, when the current block is not encoded in the MMVD, the current block may always be encoded in a regular merge mode and merge_idx may be signaled.

For example, the maximum number MaxNumMMVD-Cand of candidates included in the MMVD MVP candidate list may be predefined or may be determined according to a syntax element six_minus_max_num_mmvd_cand signaled from the encoder to the decoder. Here, six_minus_max_num_mmvd_cand may be signaled at the level of at least one of a sequence, a slice, a tile, a tile group, a picture or a brick.

For example, the maximum number of candidates included in the merge candidate list may be determined according to mmvd_merge_flag.

For example, when mmvd_merge_flag has a first value, the maximum number of candidates included in the merge candidate list may be predefined or may be determined as the maximum number MaxNumMMVDCand of candidates included in the MMVD MVP candidate list. In this case, the predefined number may be 2.

In contrast, when mmvd_merge_flag has a second value, the maximum number of candidates included in the merge candidate list may be predefined or may be determined as the maximum number MaxNumMergeCand of candidates included in the merge candidate list. In this case, the predefined number may be 6.

For example, the maximum number of merge candidates available in the current block may be determined according to mmvd_merge_flag.

For example, when mmvd_merge_flag has a first value, the maximum number of merge candidates available in the current block may be 2 and, when mmvd_merge_flag has a second value, the maximum number of merge candidates available in the current block may be 1. The first value and the second value may mean "1" and "0", respectively.

For example, merge_idx may be represented by a bin having a variable length according to the maximum number of candidates included in the merge candidate list.

The maximum number of candidates included in the merge candidate list may be differently defined according to the mode information of the current block.

For example, when the maximum number of candidates included in the merge candidate list is the maximum number MaxNumMMVDCand of candidates included in the MMVD MVP candidate list, merge_idx may be represented by a bin having a variable length according to MaxNumMMVDCand.

In contrast, the maximum number of candidates included in the merge candidate list is the maximum number MaxNumMergeCand of candidates included in the merge candidate list, merge_idx may be represented by a bin having a variable length according to MaxNumMergeCand.

For example, when the maximum number of candidates included in the merge candidate list is the maximum number MaxNumIbcMergeCand of candidates included in an IBC MVP candidate list, merge_idx may be represented by a bin having a variable length according to MaxNumIbcMergeCand.

For example, merge_idx may be binarized using truncated unary coding.

In another example, merge_idx may be represented by a bin having a variable length according to the value of mmvd_merge_flag.

For example, when mmvd_merge_flag has a first value, the maximum number MaxNumMergeCand of candidates included in the merge candidate list may be predefined or may be determined as the maximum number MaxNumMMVDCand of candidates included in the merge candidate list of the MMVD. In this case, the predefined number may be 2.

In contrast, when mmvd_merge_flag has a second value, the maximum number MaxNumMergeCand of candidates included in the merge candidate list may be predefined or may be determined as the maximum number MaxNumMergeCand of candidates included in the merge candidate list of the merge mode. In this case, the predefined number may be 5.

In this case, merge_idx may be represented by a bin having a variable length according to the maximum number of candidates included in the merge candidate list. For example, merge_idx may be binarized using truncated unary coding.

For example, mmvd_distance_idx may be represented by a bin having a variable length according to the type of the MmvdDistance value used in the MMVD. For example, mmvd_distance_idx may be binarized using a truncated unary coding method.

For example, nmvd_direction_idx may be binarized using a fixed length method.

According to another embodiment of the present invention, the maximum number MaxNumMMVDCand of candidates included in the MMVD MVP candidate list may be derived using a signaled syntax element n_minus_max_num_mmvd_cand. Here, n_minus_max_num_mmvd_cand may indicate a value obtained by subtracting the maximum number of MMVD MVP motion vector predictor candidates from a predefined number n. The maximum number MaxNumMMVDCand of candidates of the MMVD MVP candidate list may be defined as in Equation 1 below.

$$\text{MaxNumMMVDCand} = n - n\_minus\_max\_num\_mmvd\_cand \qquad \text{[Equation 1]}$$

For example, n_minus_max_num_mmvd_cand may be signaled at the level of at least one of a sequence, a slice, a tile, a tile group, a picture or a brick. For example, n may be 6.

According to another embodiment of the present invention, when mmvd_merge_flag has a first value or the current block is encoded in the MMVD, the MMVD motion vector may be derived using a sum of the motion vector predictor and the MVD.

For example, the motion vector predictor may be derived from the motion vector of the merge candidate indicated by merge_idx among the merge candidates of the merge candidate list.

In another example, the motion vector predictor may be derived from the motion vector of the MMVD MVP candidate indicated by merge_idx among the candidates of the MMVD MVP candidate list.

Here, the MMVD MVP candidate list may be generated separately from the merge candidate list. That is, the MMVD MVP candidate list for the MMVD and the merge candidate list in the merge mode without using the MMVD may be generated through different generation methods.

For example, the MMVD MVP candidate list may include as many candidates as the maximum number MaxNumMMVDCand of candidates included in the MMVD MVP candidate list, the merge candidate list in the merge mode without using the MMVD may include as many candidates as the maximum number MaxNumMergeCand of candidates included in the merge candidate list.

In another example, the MMVD MVP candidate list may include as many candidates as the maximum number MaxNumMMVDCand of candidates included in the MMVD MVP candidate list. For example, MaxNumMMVDCand may have a predefined value of 2.

In another example, MaxNumMMVDCand may be derived using n_minus_max_num_mmvd_cand.

In another example, MaxNumMMVDCand may be derived using six_minus_max_num_mmvd_cand.

In another example, the merge candidate list in the merge mode without using MMVD may include as many candidates as the maximum number MaxNumMergeCand of candidates included in the merge candidate list. For example, MaxNumMergeCand may have a predefined value of 6.

In another example, MaxNumMergeCand may be derived from six_minus_max_num_merge_cand.

In another example, the MMVD MVP candidate list may be generated using the same method as the merge candidate list. That is, the MMVD MVP candidate list for the MMVD and the merge candidate list in the merge mode without using the MMVD may be the same. In this case, when the current block is encoded in the MMVD, the motion vector predictor may be determined by merge_idx set by mmvd_cand_flag. In contrast, when the current block is not encoded in the MMVD, the motion vector predictor may be determined by merge_idx regardless of mmvd_cand_flag.

In this case, the direction component MmvdSign of the motion vector difference may be derived using mmvd_direction_idx. In this case, mmvd_direction_idx may indicate that the motion vector difference has one of direction component sets (+,0), (−,0), (0,+) and (0,−).

In addition, the distance component MmvdDistance of the motion vector difference may be derived using mmvd_distance_idx. In this case, mmvd_distance_idx may indicate that the motion vector difference has one distance component of a distance component set (1, 2, 4, 8, 16, 32, 64, 128, 256 and 512).

According to one embodiment of the present invention, the MMVD MVP candidate list may be derived using at least one of a spatial candidate derived using a referenceable spatial neighbor block, a temporal candidate derived using a referenceable temporal neighbor block, a history based motion vector predictor (HMVP) based candidate or a combined bi-predictive candidate. In this case, the MMVD MVP candidate list may include as many candidates as the number indicated by MaxNumMMVDCand.

Figure 10:
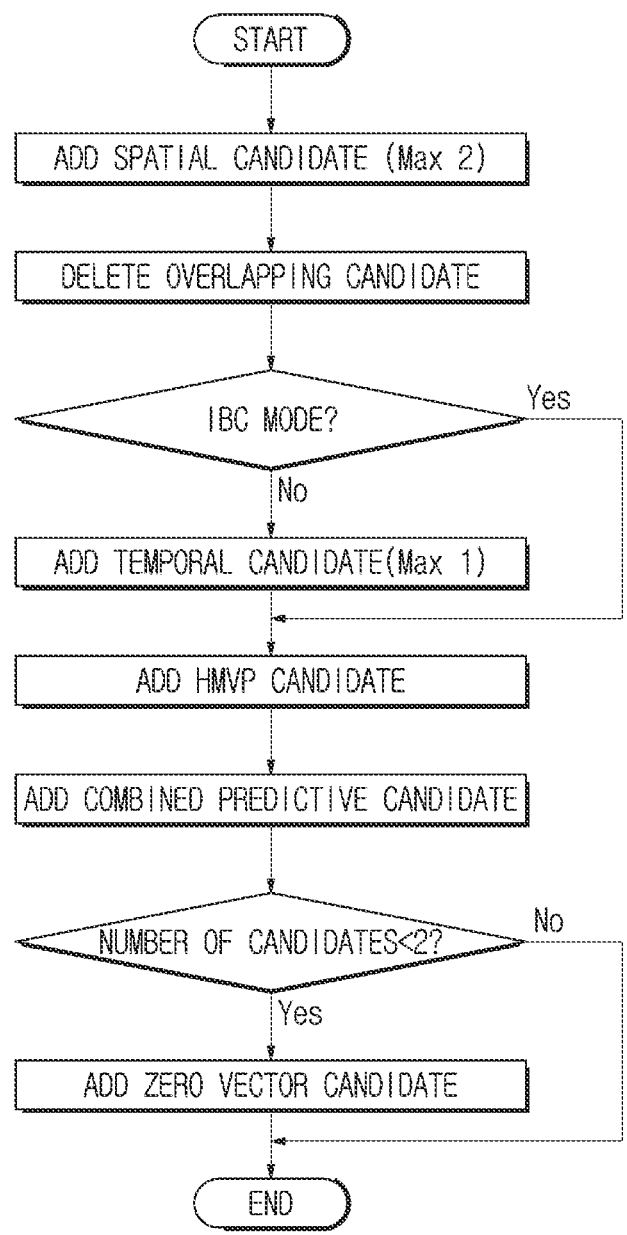
FIG. 10 is a flowchart illustrating a method of deriving a candidate list according to an embodiment of the present invention.
Figure 11:
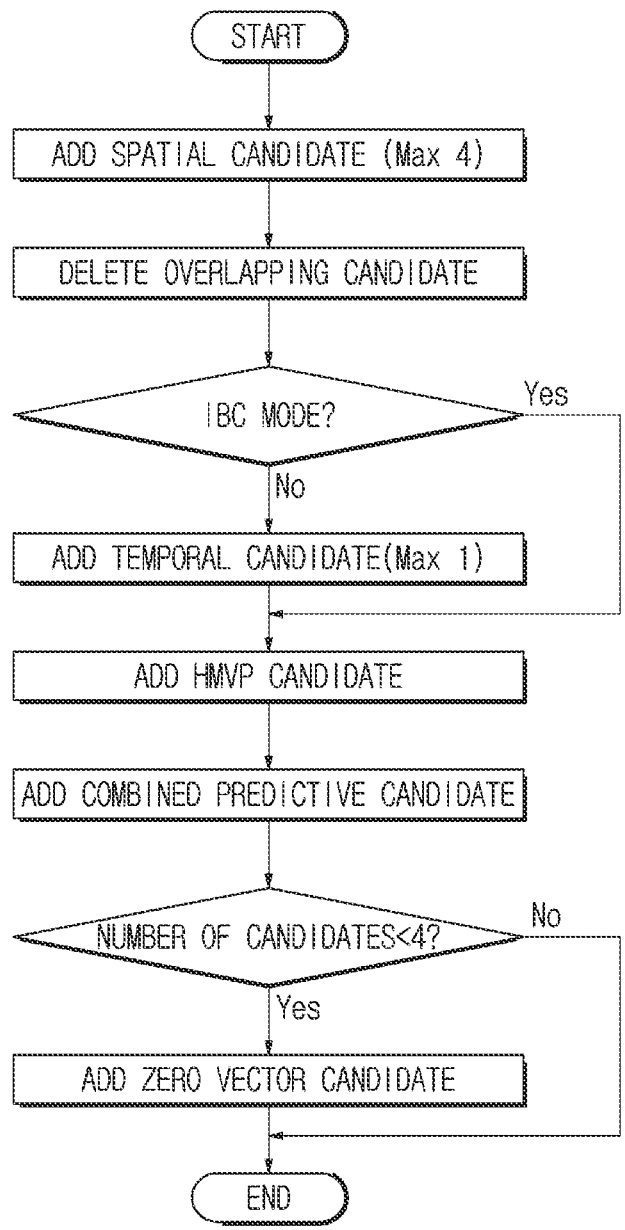
FIG. 11 is a flowchart illustrating a method of deriving a candidate list according to another embodiment of the present invention.
Figure 12:
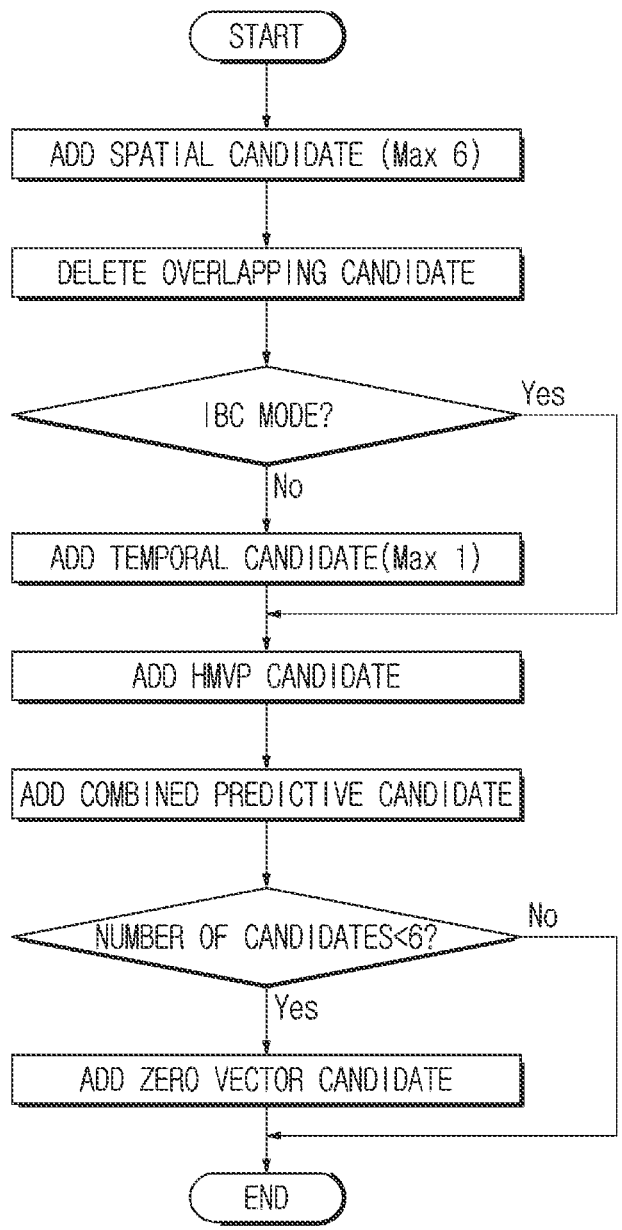
FIG. 12 is a flowchart illustrating a method of deriving a candidate list according to another embodiment of the present invention.

FIGS. 10 to 12 are flowcharts illustrating a method of deriving a candidate list according to some embodiments of the present invention.

FIG. 10 shows an example of a method of generating an MMVD MVP candidate list at an encoder or a decoder when MaxNumMMVDCand is 2. The encoder or the decoder may derive a maximum of two spatial candidates from the spatial neighbor block of the current block and add the derived spatial candidate to the candidate list. Next, the encoder or the decoder may derive a maximum of one temporal candidate from the temporal candidate unit of the current block and add the derived temporal candidate to the candidate list. Next, the encoder or the decoder may derive at least one of the HMVP based candidate or the combined predictive candidate of the current block and add the derived candidate to the candidate list. Next, the encoder or the decoder may determine the number of candidates added to the candidate list up to now, and add a zero vector candidate to the candidate list until the number of candidates included in the candidate list reaches MaxNumMMVDCand, when the number of candidates included in the candidate list is less than MaxNumMMVDCand. That is, the encoder or the decoder may add the zero vector candidate to the candidate list until the number of candidates included in the candidate list becomes 2. In this case, the zero vector candidate may mean a (0,0) vector.

FIG. 11 shows an example of a method of generating an MMVD MVP candidate list at an encoder or a decoder when MaxNumMMVDCand is 4. In comparison with the embodiment of FIG. 10, the encoder or the decoder may derive a maximum of four spatial candidates and add the derived candidates to the candidate list. Thereafter, the encoder or the decoder may add at least one of a temporal candidate, an HMVP based candidate or a combined predictive candidate to the candidate list. Next, the encoder or the decoder may add the zero vector candidate to the candidate list until the number of candidates included in the candidate list becomes 4.

FIG. 12 shows an example of a method of generating an MMVD MVP candidate list at the encoder or the decoder when MaxNumMMVDCand is 6. In comparison with the embodiment of FIG. 10, the encoder or the decoder may derive a maximum of five spatial candidates and add the derived candidates to the candidate list. Thereafter, the encoder or the decoder may add at least one of a temporal candidate, an HMVP based candidate or a combined predictive candidate to the candidate list. Next, the encoder or the decoder may add the zero vector candidate to the candidate list until the number of candidates included in the candidate list becomes 6.

According to another embodiment of the present invention, the MMVD MVP candidate list may be generated by deriving as many candidates as MaxNumMMVDCand from the merge candidate list. That is, the merge candidate list and the MMVD MVP candidate list may share as many candidates as MaxNumMMVDCand. For example, the merge candidate list and the MMVD MVP candidate list may share candidates from the first candidate to MaxNumMMVDCand in the candidate list.

MaxNumMnVDCand may be predefined or may be determined by a value signaled from the encoder to the decoder. For example, MaxNumMMVDCand may be one of 2, 4 and 6.

For example, when MaxNumMMVDCand is 2, the MMVD MVP candidate list may be derived as shown in the example of Table 5 below. That is, the merge candidate list and the MMVD MVP candidate list may share candidates from a first candidate to a second candidate.

TABLE 5

|  | Merge candidate list | MMVD candidate list |
|---|---|---|
| First candidate | (5, 0) | (5, 0) |
| Second candidate | (7, 2) | (7, 2) |
| Third candidate | (−1, 3) | X |
| Fourth candidate | (−2, −2) | X |
| Fifth candidate | (5, 1) | X |
| Sixth candidate | (2, −3) | X |

In another example, when MaxNumMMVDCand is 4, the MMVD MVP candidate list may be derived as shown in the example Table 6 below. That is, the merge candidate list and the MMVD MVP candidate list may share candidates from a first candidate to a fourth candidate.

TABLE 6

|  | Merge candidate list | MMVD candidate list |
| --- | --- | --- |
| First candidate | (5, 0) | (5, 0) |
| Second candidate | (7, 2) | (7, 2) |
| Third candidate | (−1, 3) | (−1, 3) |
| Fourth candidate | (−2, −2) | (−2, −2) |
| Fifth candidate | (5, 1) | X |
| Sixth candidate | (2, −3) | X |

In another example, when MaxNumMMVDCand is 6, the MMVD MVP candidate list may be derived as in the example of Table 7 below. That is, the merge candidate list and the MMVD MVP candidate list may share candidates from a first candidate to a sixth candidate.

TABLE 7

|  | Merge candidate list | MMVD candidate list |
| --- | --- | --- |
| First candidate | (5, 0) | (5, 0) |
| Second candidate | (7, 2) | (7, 2) |
| Third candidate | (−1, 3) | (−1, 3) |
| Fourth candidate | (−2, −2) | (−2, −2) |
| Fifth candidate | (5, 1) | (5, 1) |
| Sixth candidate | (2, −3) | (2, −3) |

According to one embodiment of the present invention, the encoder or the decoder may derive the MMVD motion information of the current block based on whether the prediction mode of the current block is an IBC mode.

In the following embodiments, a syntax element pred_mode_ibc_flag may indicate whether the current block is encoded or decoded in the IBC mode. For example, when pred_mode_ibc_flag has a first value, the current block may be encoded or decoded in the IBC mode. In contrast, when pred_mode_ibc_flag has a second value, the current block may not be encoded or decoded in the IBC mode.

For example, when mmvd_merge_flag has a first value, the encoder or the decoder may derive MMVD motion information based on pred_mode_ibc_flag as follows. In this case, the MMVD motion information may include at least one of MmvdDistance, MmvdSign or MmvdOffset. In the following embodiments, MmvdOffset may mean an actual vector value of the motion vector difference.

When pred_mode_ibc_flag has a first value, MmvdDistance may be determined using mmvd_distance_idx and Table 8 below, and MmvdOffset may be determined using Equation 2 below.

That is, when the current block is encoded or decoded in the IBC mode, MmvdDistance may be determined using Table 8, and MmvdOffset may be determined using Equation 2. Hereinafter, MmvdOffset[x0][y0][0] and MmvdOffset[x0][y0][1] may mean the x-axis value and y-axis value of the motion vector difference, respectively.

$$MmvdOffset[x0][y0][0]=(MmvdDistance[x0][y0]<<2)\\ *MmvdSign[x0][y0][0]$$

$$MmvdOffset[x0][y0][1]=(MmvdDistance[x0][y0]<<2)\\ *MmvdSign[x0][y0][1] \quad [\text{Equation 2}]$$

TABLE 8

| mmvd_distance_idx [ x0 ] [ y0 ] | MmvdDistance [ x0 ] [ y0 ] |
| --- | --- |
| 0 | 1 |
| 1 | 2 |
| 2 | 4 |
| 3 | 8 |
| 4 | 16 |
| 5 | 32 |
| 6 | 64 |
| 7 | 128 |

When the current block is not encoded or decoded in the IBC mode but is encoded or decoded in the MMVD, MmvdDistance may be determined using Table 9 below, and MmvdOffset may be determined Equation 2 above.

That is, when pred_mode_ibc_flag has a second value (the prediction mode of the current block is not the IBC mode) and mmvd_merge_flag has a first value (MMVD), MmvdDistance may be determined using Table 9 below and MmvdOffset may be determined according to Equation 2 above.

TABLE 9

| mmvd_distance_idx [ x0 ] [ y0 ] | MmvdDistance [ x0 ] [ y0 ] |
| --- | --- |
| 0 | 4 |
| 1 | 8 |
| 2 | 16 |
| 3 | 32 |
| 4 | 64 |
| 5 | 128 |
| 6 | 256 |
| 7 | 512 |

In another example, when mmvd_merge_flag has a first value, the encoder or the decoder may derive the MMVD motion information based on pred_mode_ibc_flag as follows.

For example, MmvdDistance may be determined using mmvd_distance_idx and Table 10 below according to the pred_mode_ibc_flag value, and MmvdOffset may be determined using Equation 3 below.

$$MmvdOffset[x0][y0][0]=(MmvdDistance[x0][y0]<<2)\\ *MmvdSign[x0][y0][0]$$

$$MmvdOffset[x0][y0][1]=(MmvdDistance[x0][y0]<<2)\\ *MmvdSign[x0][y0][1] \quad [\text{Equation 3}]$$

TABLE 10

| mmvd_distance_idx [ x0 ] [ y0 ] | MmvdDistance [ x0 ] [ y0 ] | |
| --- | --- | --- |
|  | pred_mode_ibc_flag == 0 | pred_mode_ibc_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

In another example, when mmvd_merge_flag has a first value, the encoder or the decoder may derive the MMVD motion information based on pred_mode_ibc_flag as follows.

When pred_mode_ibc_flag has a first value, MmvdDistance may be determined using mmvd_distance_idx and Table 11 below, and MmvdOffset may be determined using Equation 4 below.

That is, when the current block is encoded or decoded in the IBC mode and the MMVD, MmvdDistance may be determined using Table 11 below, and MmvdOffset may be determined using Equation 4.

$$MmvdOffset[x0][y0][0]=(MmvdDistance[x0][y0]<<4)\\*MmvdSign[x0][y0][0]$$

$$MmvdOffset[x0][y0][1]=(MmvdDistance[x0][y0]<<4)\\*MmvdSign[x0][y0][1] \quad \text{[Equation 4]}$$

TABLE 11

| mmvd_distance_idx [ x0 ] [ y0 ] | MmvdDistance [ x0 ] [ y0 ] |
|---|---|
| 1 | 1 |
| 2 | 4 |
| 3 | 8 |
| 4 | 16 |
| 5 | 32 |
| 6 | 64 |
| 7 | 128 |

Meanwhile, when the current block is not encoded or decoded in the IBC mode but is encoded or decoded in the MMVD, MmvdDistance may be determined using Table 11 above, and MmvdOffset may be determined according to Equation 5 below.

That is, when pred_mode_ibc_flag has a second value (the prediction mode of the current block is not the IBC mode) and mmvd_merge_flag has a first value (MMVD), MmvdDistance may be determined using Table 11 above, and MmvdOffset may be determined according to Equation 5 below.

$$MmvdOffset[x0][y0][0]=(MmvdDistance[x0][y0]<<2)\\*MmvdSign[x0][y0][0]$$

$$MmvdOffset[x0][y0][1]=(MmvdDistance[x0][y0]<<2)\\*MmvdSign[x0][y0][1] \quad \text{[Equation 5]}$$

In another example, when mmvd_merge_flag has a first value, the encoder or the decoder may derive MMVD motion information based on pred_mode_ibc_flag as follows.

For example, MmvdDistance may be determined using mmvd_distance_idx and Table 12 below, and MmvdOffset may be determined using Equation 6 below.

$$MmvdOffset[x0][y0][0]=((MmvdDistance[x0][y0]\\<<2)<<(2\*pred\_mode\_ibc\_flag))\*MmvdSign\\ [x0][y0][0]$$

$$MmvdOffset[x0][y0][1]=((MmvdDistance[x0][y0]\\<<2)<<(2\*pred\_mode\_ibc\_flag))\*MmvdSign\\ [x0][y0][1] \quad \text{[Equation 6]}$$

TABLE 12

| mmvd_distance_idx [ x0 ] [ y0 ] | MmvdDistance [ x0 ] [ y0 ] |
|---|---|
| 0 | 1 |
| 1 | 2 |
| 2 | 4 |
| 3 | 8 |
| 4 | 16 |
| 5 | 32 |
| 6 | 64 |
| 7 | 128 |

In another example, when mmvd_merge_flag has a first value, the encoder or the decoder may derive MMVD motion information based on pred_mode_ibc_flag as follows.

For example, MmvdDistance may be determined using mmvd_distance_idx and Table 12 above, and MmvdOffset may be determined using Equation 7 below.

$$MmvdOffset[x0][y0][0]=(MmvdDistance[x0][y0]<<\\ (2+2\*pred\_mode\_ibc\_flag))\*MmvdSign[x0][y0]\\ [0]$$

$$MmvdOffset[x0][y0][1]=(MmvdDistance[x0][y0]<<\\ (2+2\*pred\_mode\_ibc\_flag))\*MmvdSign[x0][y0]\\ [1] \quad \text{[Equation 7]}$$

According to another embodiment of the present invention, the encoder or the decoder may derive the MMVD motion information of the current block based on at least one of whether the current block is encoded or decoded in the IBC mode or precision information of the motion vector difference of the current block. Here, the precision information of the motion vector difference may be signaled at the level of at least one of a sequence, a slice, a tile, a tile group, a picture or a brick.

In the following embodiments, a syntax element tile_group_fpel_mmvd_enabled_flag or pic_fpel_mmvd_enabled_flag may indicate whether the motion vector of the current block uses integer sample precision. For example, when tile_group_fpel_mmvd_enabled_flag or pic_fpel_mmvd_enabled_flag has a first value, the motion vector difference of the current block may be represented by integer sample precision. In contrast, when tile_group_fpel_mmvd_enabled_flag or pic_fpel_mmvd_enabled_flag has a second value, the motion vector difference of the current block may be represented by fractional (1/n) sample precision. The first value and the second value may respectively mean "1" and "0" or "0" and "1". Hereinafter, tile_group_fpel_mmvd_enabled_flag and pic_fpel_mmvd_enabled_flag may be used as the same meaning.

For example, when mmvd_merge_flag has a first value, the encode or the decoder may derive the MMVD motion information based on at least one of pred_mode_ibc_flag or pic_fpel_mmvd_enabled_flag as follows.

When pred_mode_ibc_flag has a first value or pic_fpel_mmvd_enabled_flag has a first value, MmvdDistance may be determined using mmvd_distance_idx and Table 13 below, and MmvdOffset may be determined using Equation 8 below.

That is, when the current block is encoded or decoded in the IBC mode or the motion vector difference of the current block is represented by integer sample precision, MmvdDistance may be determined using Table 13, and MmvdOffset may be determined using Equation 8 below.

$$MmvdOffset[x0][y0][0]=MmvdDistance[x0][y0]\\<<2\*MmvdSign[x0][y0][0]$$

$$MmvdOffset[x0][y0][1]=MmvdDistance[x0][y0]\\<<2\*MmvdSign[x0][y0][1] \quad \text{[Equation 8]}$$

TABLE 13

| mmvd_distance_idx [ x0 ] [ y0 ] | MmvdDistance [ x0 ] [ y0 ] |
|---|---|
| 0 | 4 |
| 1 | 8 |
| 2 | 16 |
| 3 | 20 |

TABLE 13-continued

| mmvd_distance_idx [ x0 ] [ y0 ] | MmvdDistance [ x0 ] [ y0 ] |
|---|---|
| 4 | 64 |
| 5 | 128 |
| 6 | 256 |
| 7 | 512 |

Meanwhile, when pred_mode_ibc_flag has a second value or pic_fpel_mmvd_enabled_flag has a second value, MmvdDistance may be determined using mmvd_distance_idx and Table 14 below, and MmvdOffset may be determined using Equation 8 above.

That is, when the current block is not encoded or decoded in the IBC mode or the motion vector difference of the current block is represented by fractional sample precision, MmvdDistance may be determined using Table 14, and MmvdOffset may be determined using Equation 8 above.

TABLE 14

| mmvd_distance_idx [ x0 ] [ y0 ] | MmvdDistance [ x0 ] [ y0 ] |
|---|---|
| 0 | 1 |
| 1 | 2 |
| 2 | 4 |
| 3 | 8 |
| 4 | 16 |
| 5 | 32 |
| 6 | 64 |
| 7 | 128 |

In another example, when mmvd_merge_flag has a first value, the encoder or the decoder may derive the MMVD motion information based on at least one of pred_mode_ibc_flag or pic_fpel_mmvd_enabled_flag as follows.

For example, MmvdDistance may be determined using mmvd_distance_idx and Table 15 below according to the value of at least one of pred_mode_ibc_flag or pic_fpel_mmvd_enabled_flag, and MmvdOffset may be determined using Equation 9 below.

$$MmvdOffset[x0][y0][0]=MmvdDistance[x0][y0]\\<<2*MmvdSign[x0][y0][0]$$

$$MmvdOffset[x0][y0][1]=MmvdDistance[x0][y0]\\<<2*MmvdSign[x0][y0][1] \quad [\text{Equation 9}]$$

TABLE 15

| mmvd_distance_idx [ x0 ] [ y0 ] | MmvdDistance [ x0 ] [ y0 ] | |
|---|---|---|
| | pred_mode_ibc_flag == 0 && tile_group_fpel_mmvd_enabled_flag == 0 | pred_mode_ibc_flag == 1 \|\| tile_group_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

In another example, when mmvd_merge_flag has a first value, the encoder or the decoder may derive the MMVD motion information based on at least one of pred_mode_ibc_flag or pic_fpel_mmvd_enabled_flag as follows.

When pred_mode_ibc_flag has a first value or pic_fpel_mmvd_enabled_flag has a first value, MmmvdDistance may be derived using mmvd_distance_idx and Table 16 below, and MmvdOffset may be determined using Equation 10 below.

That is, when the current block is encoded or decoded in the IBC mode or the motion vector difference of the current block is represented by integer sample precision, MmvdDistance may be determined using Table 16 and MmvdOffset may be determined using Equation 10.

$$MmvdOffset[x0][y0][0]=(MmvdDistance[x0][y0]<<4)\\*MmvdSign[x0][y0][0]$$

$$MmvdOffset[x0][y0][1]=(MmvdDistance[x0][y0]<<4)\\*MmvdSign[x0][y0][1] \quad [\text{Equation 10}]$$

TABLE 16

| mmvd_distance_idx [ x0 ] [ y0 ] | MmvdDistance [ x0 ] [ y0 ] |
|---|---|
| 0 | 1 |
| 1 | 2 |
| 2 | 4 |
| 3 | 8 |
| 4 | 16 |
| 5 | 32 |
| 6 | 64 |
| 7 | 128 |

Meanwhile, when pred_mode_ibc_flag has a second value or pic_fpel_mmvd_enabled_flag has a second value, MmvdDistance may be determined using mmvd_distance_idx and Table 16 above, and MmvdOffset may be determined using Equation 11 below.

That is, when the current block is not encoded or decoded in the IBC mode or the motion vector difference of the current block is represented by fractional sample precision, MmvdDistance may be determined using Table 16 above, and MmvdOffset may be determined using Equation 11 below.

$$MmvdOffset[x0][y0][0]=MmvdDistance[x0][y0]\\<<2*MmvdSign[x0][y0][0]$$

$$MmvdOffset[x0][y0][1]=MmvdDistance[x0][y0]\\<<2*MmvdSign[x0][y0][1] \quad [\text{Equation 11}]$$

In another example, when mmvd_merge_flag has a first value, the encoder or the decoder may derive the MMVD motion information based on at least one of pred_mode_ibc_flag or pic_fpel_mmvd_enabled_flag as follows.

For example, MmvdDistance may be determined using mmvd_distance_idx and Table 17 below, and MmvdOffset may be determined using Equation 12 below.

$$MmvdOffset[x0][y0][0]=((MmvdDistance[x0][y0]\\<<2)<<(2*pred\_mode\_ibc\_flag|tile\_group\_fpel\_mmvd\_enabled\_flag))*Mmvd\ Sign[x0][y0][0]$$

$$MmvdOffset[x0][y0][1]=((MmvdDistance[x0][y0]\\<<2)<<(2*pred\_mode\_ibc\_flag|tile\_group\_fpel\_mmvd\_enabled\_flag))*Mmvd\ Sign[x0][y0][1] \quad [\text{Equation 12}]$$

TABLE 17

| mmvd_distance_idx [ x0 ] [ y0 ] | MmvdDistance [ x0 ] [ y0 ] |
|---|---|
| 0 | 1 |
| 1 | 2 |
| 2 | 4 |
| 3 | 8 |
| 4 | 16 |

TABLE 17-continued

| mmvd_distance_idx [ x0 ] [ y0 ] | MmvdDistance [ x0 ] [ y0 ] |
|---|---|
| 5 | 20 |
| 6 | 64 |
| 7 | 128 |

In another example, when mmvd_merge_flag has a first value, the encoder or the decoder may derive the MMVD motion information based on at least one of pred_mode_ibc_flag or pic_fpel_mmvd_enabled_flag as follows.

For example, MmvdDistance may be determined using mmvd_distance_idx and Table 17 above, and MmvdOffset may be determined using Equation 13 below.

MmvdOffset[x0][y0][0]=(MmvdDistance[x0][Y]<<
(2+2*(pred_mode_*ibc*_flag||tile_
group_fpel_mmvd_enabled_flag)))*MmvdSign
[x0][y0][0]

MmvdOffset[x0][y0][1]=(MmvdDistance[x0][y0]<<
(2+2*(pred_mode_*ibc*_flag||tile_
group_fpel_mmvd_enabled_flag)))*MmvdSign
[x0][y0][1]  [Equation 13]

According to another embodiment of the present invention, the encoder or the decoder may derive the MMVD motion information of the current block based on the precision information of the motion vector difference of the current block.

For example, when mmvd_merge_flag has a first value, the encoder or the decoder may derive the MMVD motion information based on pic_fpel_mmvd_enabled_flag as follows.

For example, MmvdDistance may be determined using mmvd_distance_idx and Table 18 below according to the pic_fpel_mmvd_enabled_flag value, and MmvdOffset may be determined using Equation 14 below.

MmvdOffset[x0][y0][0]=(MmvdDistance[x0][y0]<<2)
*MmvdSign[x0][y0][0]

MmvdOffset[x0][y0][1]=(MmvdDistance[x0][y0]<<2)
*MmvdSign[x0][y0][1]  [Equation 14]

TABLE 18

| mmvd_distance_idx [ x0 ] [ y0 ] | MmvdDistance [ x0 ] [ y0 ] | |
|---|---|---|
| | pic_fpel_mmvd_enabled_flag == 0 | pic_fpel_mmvd_enabled_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

Hereinafter, a method of encoding/decoding an image using a detailed merge mode according to another embodiment of the present invention will be described in detail.

The image may be encoded/decoded according to at least one of the following embodiments or a combination thereof. Using the following embodiments, the reference bock of the current block may be efficiently determined in the image encoding/decoding process, thereby improving encoding efficiency of the image encoder and decoding efficiency of the image decoder.

In the related art, there is no separate detailed mode for the merge mode. However, according to the present invention, the merge mode may include a detailed mode of at least one of a regular merge mode, an MMVD merge mode, an affine merge mode, a multi-hypothesis merge mode or a triangular merge mode.

According to the present invention, the encoder or the decoder may encode or decode detailed merge mode information, in order to indicate which detailed merge mode is used to encode or decode the current block. For example, the encoder or the decoder may determine which detailed merge mode is used to encode or decode the current block, using a syntax element merge_mode_idx. That is, the encoder may signal the detailed merge mode information in order to indicate the detailed merge mode of the current block. For example, the detailed merge mode information or merge_mode_idx may be signaled at the level of at least one of a sequence, a slice, a tile, a tile group, a picture or a brick.

Figure 13:
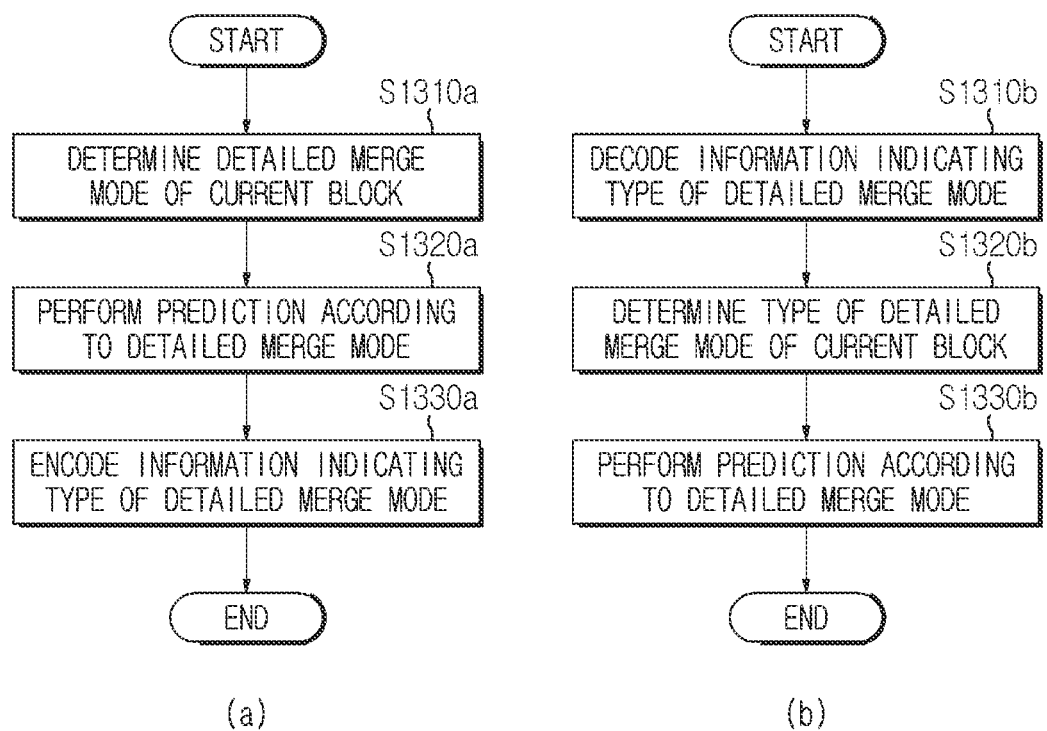
FIG. 13 is a flowchart illustrating an image encoding/decoding method according to another embodiment of the present invention.

FIG. 13 is a flowchart illustrating an image encoding/decoding method according to another embodiment of the present invention.

Referring to FIG. 13, the image encoding method according to the present invention may include step S1310a of determining the type of the detailed merge mode of the current block, step S1320a of performing prediction with respect to the current block according to the determined type of the detailed merge mode, and step S1330a of encoding information indicating the type of the detailed merge mode.

Referring to FIG. 13b, the image decoding method according to the present invention may include step S1310b of decoding information indicating the type of the detailed merge mode of the current block, step S1320b of determining the type of the detailed merge mode of the current block using the information indicating the type of the detailed merge mode, and step S1330b of performing prediction with respect to the current block according to the determined type of the detailed merge mode.

Here, the type of the detailed merge mode may be determined based on at least one of an encoding parameter, picture information, slice information, a quantization parameter QP, a coding block flag CBF, a block size, a block depth, a block form, an entropy encoding method, an intra prediction mode of a neighbor block or a temporal layer level.

Hereinafter, the steps shown in FIG. 13 will be described in detail.

First, steps S1310a and S1320b of determining the type of the detailed merge mode of the current block will be described.

According to one embodiment of the present invention, the encoder or the decoder may determine the detailed merge mode of the current block according to merge_mode_idx.

For example, when merge_mode_idx has a first value, the current block may be encoded or decoded in the regular merge mode. When merge_mode_idx indicates a first value, merge_idx may be signaled.

Meanwhile, when merge_mode_idx has a second value, the current block may be encoded or decoded in the MMVD merge mode. When merge_mode_idx indicates a second value, MMVD motion information of at least one of mmvd_merge_flag, merge_idx, mmvd_distance_idx or mmvd_direction_idx may be signaled.

Meanwhile, when merge_mode_idx indicates a third value, the current block may be encoded or decoded in the affine merge mode.

Meanwhile, when merge_mode_idx indicates a fourth value, the current block may be encoded or decoded in the multi-hypothesis merge mode.

When merge_mode_idx indicates a fifth value, the current block may be encoded or decoded in the triangular merge mode.

When merge_mode_idx indicates a sixth value, the current block may be encoded or decoded in the other detailed merge mode excluding the regular merge mode, the MMVD merge mode, the affine merge mode, the multi-hypothesis merge mode and the triangular merge mode.

According to another embodiment of the present invention, the encoder or the decoder may binarize or parse merge_idx based on the type of the detailed merge mode indicated by merge_mode_idx.

For example, when merge_mode_idx has an n-th value and the maximum number of candidates in the detailed mode indicated by merge_mode_idx is M, the encoder or the decoder may binarize or parse merge_idx according to the M value.

For example, when merge_mode_idx indicates a first value and the current block is encoded or decoded in the regular merge mode, merge_idx may be binarized or parsed according to the maximum number of candidates included in the merge candidate list. For example, when the maximum number of candidates included in the merge candidate list is 6, merge_idx may be binarized or parsed according to Table 19 below.

TABLE 19

| Index     | 0 | 1  | 2   | 3    | 4     | 5     |
|-----------|---|----|-----|------|-------|-------|
| merge_idx | 0 | 10 | 110 | 1110 | 11110 | 11111 |

For example, when merge_mode_idx indicates a second value and the current block is encoded or decoded in the MMVD merge mode, merge_idx or mmvd_cand_flag may be binarized or parsed according to the maximum number of candidates included in the MMVD MVP candidate list (or MMVD merge candidate list). For example, when the maximum number of candidates included in the MMVD MVP candidate list is 2, merge_idx or mmvd_cand_flag may be binarized or parsed according to Table 20 below.

TABLE 20

|           | Index |   |
|-----------|-------|---|
|           | 0     | 1 |
| merge_idx | 0     | 1 |

According to another embodiment of the present invention, the encoder or the decoder may binarize or parse merge_mode_idx based on the number of types of the detailed merge modes indicated by merge_mode_idx.

For example, the encoder or the decoder may binarize or parse merge_mode_idx using a fixed length coding method. For example, when the total number of types of detailed merge modes is 6, merge_mode_idx may be binarized or parsed according to Table 21 below.

TABLE 21

| Index     | 0 | 1  | 2   | 3    | 4     | 5     |
|-----------|---|----|-----|------|-------|-------|
| merge_idx | 0 | 10 | 110 | 1110 | 11110 | 11111 |

In another example, the encoder or the decoder may binarize or parse merge_mode_idx using a truncated unary coding method. For example, when the total number of types of detailed merge modes is 5, merge_mode_idx may be binarized or parsed according to Table 22 below.

TABLE 22

|                | Index |     |     |     |     |
|----------------|-------|-----|-----|-----|-----|
|                | 0     | 1   | 2   | 3   | 4   |
| merge_mode_idx | 000   | 001 | 010 | 011 | 100 |

In another example, the encoder or the decoder may binarize or parse merge_mode_idx using a truncated binary coding method. For example, when the total number of types of detailed merge modes is 5, merge_mode_idx may be binarized or parsed according to Table 23 below.

TABLE 23

|                | Index |    |    |     |     |
|----------------|-------|----|----|-----|-----|
|                | 0     | 1  | 2  | 3   | 4   |
| merge_mode_idx | 00    | 01 | 10 | 110 | 111 |

According to another embodiment of the present invention, in applying of the detailed merge_mode, when a syntax element indicating which of the candidates of the candidate list is used to perform prediction is encoded or decoded, different context-adaptive binary arithmetic coding (CABAC) contexts may be applied for each syntax element. Hereinafter, applying different CABAC contexts may mean that an initialization value initValue for entropy-encoding or decoding of the syntax element and a probability update method are different.

For example, a syntax element indicating which of the candidates of the candidate list is used to perform prediction may be one of merge_idx used in the regular merge mode, mmvd_merge_flag or mmvd_cand_flag used in the MMVD merge_mode, merge_triangle_idx used in the triangular merge mode or merge_subblock_idx used in the affine mode. Syntax elements may be entropy-encoded or decoded using different contexts, respectively.

For example, the syntax elements may be entropy-encoded or decoded using context assignment according to Table 24 below and the initValue value of Table 25. In the following tables, each numerical value is an example and the scope of the present invention is not limited to the numerical values used in the following tables.

TABLE 24

| | | binIdx | | | | | |
|---|---|---|---|---|---|---|---|
| | | 0 | 1 | 2 | 3 | 4 | >=5 |
| ctxIdx + ctxInc | merge_idx | 0 | bypass | bypass | bypass | bypass | na |
| | mmvd_merge_flag mmvd_cand_flag | 0 | na | na | na | na | na |
| | merge_triangle_idx | 0 | bypass | bypass | bypass | bypass | bypass |
| | merge_subblock_idx (sps_sbtmvp_enabled_flag == 0) | 0 | bypass | bypass | bypass | bypass | bypass |
| | merge_subblock_idx (sps_sbtmvp_enabled_flag == 1) | 0 | 1 | 2 | 3 | 4 | 4 |

TABLE 25

| | | ctxIdx + ctxInc | | | |
|---|---|---|---|---|---|
| | Initialization variable | 0 | 1 | 2 | 3 |
| initValue | merge_idx | 167 | na | na | na |
| | mmvd_merge_flag mmvd_cand_flag | 154 | na | na | na |
| | merge_triangle_idx | 155 | na | na | na |
| | merge_subblock_idx | 123 | 154 | 154 | 168 |

According to another embodiment of the present invention, in applying of the detailed merge mode, when a syntax element indicating which of the candidates of the candidate list is used to perform prediction is encoded or decoded, the same CABAC content is applicable to at least two syntax elements. Hereinafter, applying the same CABAC context may mean that an initialization value initValue for entropy-encoding or decoding of the syntax element and a probability update method are the same, and mean that the same CABAC context probability is updated using the probability of the same CABAC context during entropy-encoding or decoding.

For example, the same CABAC content is applicable to at least two of merge_idx, mmvd_cand_flag (or mmvd_merge_cand) and merge_triangle_idx.

For example, the syntax elements may be entropy-encoded or decoded using at least one of the context assignments according to Tables 26 to 28 below and at least one of initValue value assignments according to Tables 29 to 30. In the following tables, each numerical value is an example and the scope of the present invention is not limited to the numerical values used in the following tables.

TABLE 26

| | | binIdx | | | | | |
|---|---|---|---|---|---|---|---|
| | | 0 | 1 | 2 | 3 | 4 | >=5 |
| ctxIdx + ctxInc | merge_idx | | bypass | bypass | bypass | bypass | na |
| | mmvd_merge_flag mmvd_cand_flag | 0 | na | na | na | na | na |
| | merge_triangle_idx | | bypass | bypass | bypass | bypass | bypass |
| | merge_subblock_idx (sps_sbtmvp_enabled_flag == 0) | 0 | bypass | bypass | bypass | bypass | bypass |
| | merge_subblock_idx (sps_sbtmvp_enabled_flag == 1) | 0 | 1 | 2 | 3 | 4 | 4 |

TABLE 27

| | | binIdx | | | | | |
|---|---|---|---|---|---|---|---|
| | | 0 | 1 | 2 | 3 | 4 | >=5 |
| ctxIdx + ctxInc | merge_idx mmvd_merge_flag mmvd_cand_flag merge_triangle_idx | 0 | bypass | bypass | bypass | bypass | bypass |
| | merge_subblock_idx (sps_sbtmvp_enabled_flag == 0) | 0 | bypass | bypass | bypass | bypass | bypass |
| | merge_subblock_idx (sps_sbtmvp_enabled_flag == 1) | 0 | 1 | 2 | 3 | 4 | 4 |

TABLE 28

| | | binIdx | | | | | |
|---|---|---|---|---|---|---|---|
| | | 0 | 1 | 2 | 3 | 4 | >=5 |
| ctxIdx + ctxInc | merge_idx mmvd_merge_flag mmvd_cand_flag | 0 | bypass | bypass | bypass | bypass | na |

TABLE 28-continued

|  | binIdx | | | | | |
|---|---|---|---|---|---|---|
|  | 0 | 1 | 2 | 3 | 4 | >=5 |
| merge_triangle_idx | | | | | | |
| merge_subblock_idx (sps_sbtmvp_enabled_flag == 0) | 0 | bypass | bypass | bypass | bypass | bypass |
| merge_subblock_idx (sps_sbtmvp_enabled_flag == 1) | 0 | 1 | 2 | 3 | 4 | 4 |

TABLE 29

|  |  | ctxIdx + ctxInc | | | |
|---|---|---|---|---|---|
|  | Intialization variable | 0 | 1 | 2 | 3 |
| initValue | merge_idx | 160 | na | na | na |
|  | mmvd_merge_flag | | | | |
|  | mmavd_cand_flag | | | | |
|  | merge_triangle_idx | | | | |
|  | merge_subblock_idx | 123 | 154 | 154 | 168 |

TABLE 30

|  |  | ctxIdx + ctxInc | | | |
|---|---|---|---|---|---|
|  | Intialization variable | 0 | 1 | 2 | 3 |
| initValue | merge_idx | 160 | na | na | na |
|  | mmvd_merge_flag | | | | |

TABLE 30-continued

|  |  | ctxIdx + ctxInc | | | |
|---|---|---|---|---|---|
|  | Intialization variable | 0 | 1 | 2 | 3 |
|  | mmvd_cand_flag | | | | |
|  | merge_triangle_idx | | | | |
|  | merge_subblock_idx | 123 | 154 | 154 | 168 |

In another example, the same CABAC context is applicable to at least two of the syntax elements merge_idx, mmvd_cand_flag (or mmvd_merge_cand), merge_triangle_idx and merge_subblock_idx.

For example, the syntax elements may be entropy-encoded or decoded using at least one of the context assignments according to Tables 31 to 33 below and at least one of initValue value assignments according to Tables 34 to 35. In the following tables, each numerical value is an example and the scope of the present invention is not limited to the numerical values used in the following tables.

TABLE 31

|  |  | binIdx | | | | | |
|---|---|---|---|---|---|---|---|
|  |  | 0 | 1 | 2 | 3 | 4 | >=5 |
| ctxIdx + ctxInc | merge_idx | | bypass | bypass | bypass | bypass | na |
|  | mmvd_merge_flag | 0 | na | na | na | na | na |
|  | mmvd_cand_flag | | | | | | |
|  | merge_triangle_idx | | bypass | bypass | bypass | bypass | bypass |
|  | merge_subblock_idx | | bypass | bypass | bypass | bypass | bypass |

TABLE 32

|  |  | binIdx | | | | | |
|---|---|---|---|---|---|---|---|
|  |  | 0 | 1 | 2 | 3 | 4 | >=5 |
| ctxIdx + ctxInc | merge_idx | 0 | bypass | bypass | bypass | bypass | bypass |
|  | mmvd_merge_flag | | | | | | |
|  | mmvd_cand_flag | | | | | | |
|  | merge_triangle_idx | | | | | | |
|  | merge_subblock_idx | | | | | | |

TABLE 33

|  |  | binIdx | | | | | |
|---|---|---|---|---|---|---|---|
|  |  | 0 | 1 | 2 | 3 | 4 | >=5 |
| ctxIdx + ctxInc | merge_idx | 0 | bypass | bypass | bypass | bypass | na |
|  | mmvd_merge_flag | | | | | | |
|  | mmvd_cand_flag | | | | | | |

TABLE 33-continued

|  | binIdx | | | | | |
|---|---|---|---|---|---|---|
| — | 0 | 1 | 2 | 3 | 4 | >=5 |
| merge_triangle_idx | | | | | | |
| merge_subblock_idx | | | | | | |

TABLE 34

| | | ctxIdx + ctxInc | | | |
|---|---|---|---|---|---|
| Intialization variable | | 0 | 1 | 2 | 3 |
| initValue | merge_idx | 150 | na | na | na |
| | mmvd_merge_flag | | na | na | na |
| | mmvd_cand_flag | | | | |
| | merge_triangle_idx | | na | na | na |
| | merge_subblock_idx | | na | na | na |

TABLE 35

| | | ctxIdx + ctxInc | | | |
|---|---|---|---|---|---|
| Initialization variable | | 0 | 1 | 2 | 3 |
| initValue | merge_idx | 150 | na | na | na |
| | mmvd_merge_flag | | | | |
| | mmvd_cand_flag | | | | |
| | merge_triangle_idx | | | | |
| | merge_subblock_idx | | | | |

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:
1. A decoding method, comprising:
deriving a motion vector of a current block; and
generating a prediction block for the current block using the motion vector of the current block,
wherein the motion vector of the current block corresponds to a sum of a motion vector of a candidate in a list and a motion vector difference,
wherein first information indicating the candidate among candidates in the list is decoded based on a maximum number of the candidates in the list,
wherein a first indicator representing direction information of the motion vector difference and a second indicator representing distance information of the motion vector difference are used,
wherein precision information for the motion vector difference is used, and
wherein the precision information indicates whether the motion vector difference uses only an integer sample precision.
2. The decoding method of claim 1, wherein
the list is a merge candidate list,
selection information is information to indicate a prediction mode for the current block among a plurality of prediction modes using inter prediction using the merge candidate list,
a value of the selection information is a first value in a case that first prediction mode is used,
a merge index is decoded in a case that a value of the selection information is the first value, and
the merge index indicates one candidate among candidates in the merge candidate list.
3. The decoding method of claim 1, wherein
the number of the candidates is three or more.
4. The decoding method of claim 1, wherein
the list is a merge candidate list, and
only some of the candidates in the merge candidate list can be selected as the candidate.
5. An encoding method, comprising:
deriving a motion vector of a current block; and
generating a prediction block for a current block using the motion vector of the current block,
wherein the motion vector of the current block corresponds to a sum of a motion vector of a candidate in a list and a motion vector difference,
wherein first information indicating the candidate among candidates in the list is encoded based on a maximum number of the candidates in the list,
wherein a first indicator representing direction information of the motion vector difference and a second indicator representing distance information of the motion vector difference are used,
wherein precision information for the motion vector difference is used, and
wherein the precision information indicates whether the motion vector difference uses only an integer sample precision.
6. The encoding method of claim 5, wherein
the list is a merge candidate list,
selection information is information to indicate a prediction mode for the current block among a plurality of prediction modes using inter prediction using the merge candidate list,
a value of the selection information is a first value in a case that the first prediction mode is used,
a merge index is encoded in a case that a value of the selection information is the first value, and
the merge index indicates one candidate among candidates in the merge candidate list.
7. The encoding method of claim 5, wherein
the list is a merge candidate list, and
only some of the candidates in the merge candidate list can be selected as the candidate.
8. The encoding method of claim 5, wherein
the first prediction mode uses an indicator representing direction information of the motion vector difference and an indicator representing distance information of the motion vector difference.
9. A non-transitory computer-readable storage medium storing a bitstream generated by the encoding method of claim 5.
10. A non-transitory computer-readable storage medium storing a bitstream for a video decoding, the bitstream comprising:
information for a prediction mode for a current block; and
information for prediction for the current block, wherein
a motion vector of a current block is derived using the information for the prediction mode for the current block and the information for the prediction for the current block,
a prediction block for the current block is generated using the motion vector of the current block,
wherein the motion vector of the current block corresponds to a sum of a motion vector of a candidate in a list and a motion vector difference,
wherein first information indicating the candidate among candidates in the list is decoded based on a maximum number of the candidates in the list,
wherein a first indicator representing direction information of the motion vector difference and a second indicator representing distance information of the motion vector difference are used,
wherein precision information for the motion vector difference is used, and
wherein the precision information indicates whether the motion vector difference uses only an integer sample precision.
11. The non-transitory computer-readable storage medium of claim 10, wherein the list is a merge candidate list, selection information is information to indicate the prediction mode for the current block among a plurality of prediction modes using inter prediction using the merge candidate list, a value of the selection information is a first value in a case that the first prediction mode is used, a merge index is decoded in a case that a value of the selection information is the first value, and the merge index indicates one candidate among candidates in the merge candidate list.

12. The non-transitory computer-readable storage medium of claim 10, wherein the list is a merge candidate list, and only some of the candidates in the merge candidate list can be selected as the candidate.

\* \* \* \* \*